US012783225B2

(12) United States Patent
Wang et al.

(10) Patent No.: US 12,783,225 B2
(45) Date of Patent: Nov. 3, 2026

(54) VEHICLE UPGRADE METHOD AND APPARATUS

(71) Applicant: Yinwang Intelligent Technologies Co., Ltd., Shenzhen (CN)

(72) Inventors: Yong Wang, Shenzhen (CN); Tao Ma, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 18/189,778

(22) Filed: Mar. 24, 2023

(65) Prior Publication Data

US 2023/0289174 A1 Sep. 14, 2023

Related U.S. Application Data

(63) Continuation of application No. PCT/CN2020/118208, filed on Sep. 27, 2020.

(51) Int. Cl.
*G06F 8/65* (2018.01)

(52) U.S. Cl.
CPC .................................... *G06F 8/65* (2013.01)

(58) Field of Classification Search
CPC .................................................. G06F 8/60–66
See application file for complete search history.

(56) References Cited

U.S. PATENT DOCUMENTS 8,204,969 B2 * 6/2012 Carcerano ................ G06F 8/65 709/224
10,552,140 B2 * 2/2020 Mukherjee ................ G06F 8/65
10,834,206 B2 * 11/2020 Acharya ................. H04W 4/44
10,929,120 B2 * 2/2021 Shimomura .......... B60R 16/023
11,509,651 B2 * 11/2022 La Torre ............... H04L 63/083
(Continued)

FOREIGN PATENT DOCUMENTS

CN 109582344 A 4/2019
CN 111064803 A 4/2020
(Continued)

OTHER PUBLICATIONS

Machine Translation of JP2018045515A, Espacenet [online], 2025 [retrieved Jan. 24, 2025], Retrieved from Internet: <URL: https://worldwide.espacenet.com/publicationDetails/description?CC=JP&NR=2018045515A&KC=A&FT=D&ND=3&date=20180322&DB=EPODOC&locale=en_EP>, pp. 1-35.*
(Continued)

*Primary Examiner* — Todd Aguilera
(74) *Attorney, Agent, or Firm* — WOMBLE BOND DICKINSON (US) LLP

(57) ABSTRACT

A server determines at least two component groups in a vehicle, where each component group includes one upgrade control component configured to control a component in the component group to perform an over the air (OTA) upgrade; the server generates a first upgrade package for a first component group in the at least two component groups, where an upgrade control component in the first component group is a first upgrade control component; and the server sends the first upgrade package to the first upgrade control component, where the first upgrade package is used to upgrade a component in the first component group.

19 Claims, 10 Drawing Sheets

(56) References Cited

U.S. PATENT DOCUMENTS

| | | | | |
|---|---|---|---|---|
| 11,645,062 | B2 * | 5/2023 | Nakaguma | G06F 8/65 717/168 |
| 11,947,953 | B2 * | 4/2024 | Abe | B60W 50/00 |
| 2010/0037216 | A1 * | 2/2010 | Carcerano | G06F 8/65 717/173 |
| 2013/0344802 | A1 * | 12/2013 | Armour | H04W 24/00 455/39 |
| 2019/0235850 | A1 * | 8/2019 | Mukherjee | G06F 8/71 |
| 2019/0265965 | A1 | 8/2019 | Acharya et al. | |
| 2019/0265966 | A1 * | 8/2019 | Shimomura | B60R 16/023 |
| 2019/0268420 | A1 * | 8/2019 | Acharya | H04L 63/166 |
| 2019/0354363 | A1 * | 11/2019 | Nakaguma | G06F 13/128 |
| 2020/0057630 | A1 | 2/2020 | Cho et al. | |
| 2021/0157573 | A1 * | 5/2021 | Abe | G06F 3/0604 |
| 2021/0243184 | A1 * | 8/2021 | La Torre | H04L 63/083 |

FOREIGN PATENT DOCUMENTS

| | | | | | |
|---|---|---|---|---|---|
| CN | 111327475 | A | | 6/2020 | |
| CN | 111669428 | A | | 9/2020 | |
| JP | 2018045515 | A | * | 3/2018 | G06F 11/1433 |
| WO | WO-2019182509 | A1 | * | 9/2019 | G06F 11/1433 |

OTHER PUBLICATIONS

Abdelfadeel Khaled et al: “How to Make Firmware Updates over LoRaWAN Possible”,2020 IEEE 21st International Symposium On “A World of Wireless, Mobile and Multimedia Networks” (WOWMOM),IEEE,XP033838677,Aug. 31, 2020,total 10 pages.

* cited by examiner

VEHICLE UPGRADE METHOD AND APPARATUS

CROSS-REFERENCE TO RELATED APPLICATIONS

This application is a continuation of International Application No. PCT/CN2020/118208, filed on Sep. 27, 2020, the disclosure of which is hereby incorporated by reference in its entirety.

TECHNICAL FIELD

This application relates to the field of connected vehicle technologies, and in particular, to a vehicle upgrade method and apparatus.

BACKGROUND

Over the air (OTA) is a technology for downloading data through a wireless network, and has been widely applied to upgrade of devices such as a smart television, a mobile phone, a tablet computer, and a set-top box. The OTA technology is mainly used to download an OTA upgrade package through a network (such as Wi-Fi, 3G, or 4G) for automatic upgrade (or download an OTA upgrade package to an SD card for upgrade). OTA upgrade has a high speed and has little impact on data. Therefore, with development of intelligent connected vehicles, OTA upgrade becomes a main method for vehicle function upgrade. Vehicle vendors (that is, original equipment manufacturers (OEM)) upgrade related software or firmware of vehicles by using the OTA technology. This helps the vendors reduce recall costs, quickly respond to requirements, and improve user experience.

A vehicle includes a plurality of nodes, and the plurality of nodes may be associated with each other and cooperate with each other. Therefore, upgrade of the vehicle usually relates to nodes of a plurality of components, and an OTA master (Master) module is used to coordinate upgrade of all nodes. The OTA master module is configured on one (or more) of the nodes (for example, a gateway (GW) or a telematics box T-Box) of the vehicle, and coordinates and controls an OTA slave module in another node, to jointly complete vehicle upgrade. However, in the manner in which the OTA master module is used to download an installation package and coordinate upgrade of another node, the OTA master module needs to download and distribute upgrade packages of a plurality of OTA slave modules. This imposes a heavy burden on storage and load of the OTA master module, and affects vehicle upgrade efficiency and vehicle stability. For example, if the upgrade package is large, storage space of the OTA master module may be insufficient. As a result, some vehicle components cannot be upgraded in a timely manner. For another example, as a structure of the vehicle becomes increasingly complex, efficiency of upgrading the vehicle in such a manner becomes increasingly low, and a requirement of a user cannot be met.

SUMMARY

Embodiments of this application disclose a vehicle upgrade method and apparatus, to improve vehicle upgrade efficiency and vehicle stability.

According to a first aspect, an embodiment of this application discloses a vehicle upgrade method, including:

a server determines at least two component groups in a vehicle, where each component group includes one upgrade control component configured to control a component in the component group to perform OTA upgrade;

the server generates a first upgrade package for a first component group in the at least two component groups, where an upgrade control component in the first component group is a first upgrade control component; and the server sends the first upgrade package to the first upgrade control component, where the first upgrade package is used to upgrade a component in the first component group.

In this embodiment of this application, the server generates an upgrade package of a component group for the component group in the vehicle, and then distributes the upgrade package to an upgrade control component in the component group, so that the upgrade control component upgrades a component in the component group. Compared with that in a case in which one OTA upgrade master module performs upgrade control on all components in the vehicle, vehicle upgrade efficiency is improved. Further, each component may be upgraded by a close upgrade component in each component group controls the component in the group, and can monitor, detect, and command upgrade in a timely manner. Therefore, upgrade of the component can be completed as soon as possible, and vehicle stability can be improved.

The server mentioned in embodiments of this application may be one server, or may be a server cluster including a plurality of servers. Specifically, the server may include a server that centrally stores upgrade packages, or may include a distributed server cluster that stores upgrade packages, group configuration information, or upgrade policy information in a distributed manner. For example, a distributed server may be a server cluster including a plurality of servers. The cluster may include a cloud computing server, a content delivery network (CDN) server, a network time protocol (NTP) server, a domain name system (DNS) server, and the like. The servers may coordinate with each other to jointly complete functions such as computing, data storage, and communication. For ease of description, a single server, a distributed server, and a server cluster are collectively referred to as a server in embodiments of this application.

The component group mentioned in embodiments of this application includes at least one component in a vehicle. Each component group includes one upgrade control component configured to control a component in the component group to perform OTA upgrade, and may further include another component in the vehicle. When a component group includes only one component, the component is not only an upgrade control component in the component group, but also a to-be-upgraded component in the component group.

The upgrade control component is configured to control the component in the component group to complete upgrade, and may be an independent component in the vehicle, or may be deployed as a module in one of components (for example, may be deployed in a domain controller and/or a vehicle integration unit).

Further, the server generates a second upgrade package for a second component group in the at least two component groups, where an upgrade control component in the second component group is a second upgrade control component.

The server sends the second upgrade package to the second upgrade control component, where the second upgrade package is used to upgrade a component in the second component group.

In an embodiment of the first aspect, after the server generates a first upgrade package for a first component group in the at least two component groups, the method further includes:

the server allocates a first download address for downloading the first upgrade package; and the server sends the first download address to an OTA upgrade master node in the vehicle.

That the server sends the first upgrade package to the first upgrade control component includes:

the server establishes, with the first upgrade control component, a first secure channel for downloading the first upgrade package; and the server sends the first upgrade package to the first upgrade control component through the first secure channel.

The foregoing describes a manner of downloading an upgrade data package. The server may allocate a download address to the first upgrade package. The download address may be first sent to the OTA upgrade master node, and then the OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the server directly establishes a connection to the upgrade control component in the group to send the download address, network resource overheads can be reduced, complexity can be reduced, and upgrade efficiency can be improved.

Further, the server may sign the download address, and the OTA upgrade master node may verify the signature, to ensure correctness of the download address, avoid tampering of the download address, and ensure security of a vehicle upgrade process.

The OTA upgrade master node mentioned in embodiments of this application is an electronic device that supports an OTA technology. The OTA upgrade master node may communicate with the server and each upgrade control component in the vehicle, to assist in completing upgrade of each component in the vehicle. In an embodiment, the OTA upgrade master node may be an independent component in the vehicle, or may be deployed as a module in one of the components. Further, the OTA upgrade master node may be a hardware module, or may be a computer program. For example, a T-Box of a vehicle may include an OTA module, and the OTA module supports an OTA technology. Therefore, the T-Box may be considered as an OTA upgrade master node. For another example, a component supporting an OTA technology is pre-assembled in a vehicle, and a processor, an integrated circuit, or the like is integrated into the component. The component supporting the OTA technology may be considered as an OTA upgrade master node.

In another embodiment of the first aspect, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another embodiment of the first aspect, the first secure channel includes at least a hypertext transfer protocol secure HTTPS secure channel, a transport layer security TLS secure channel, or a datagram transport layer security DTLS secure channel.

In another embodiment of the first aspect, that the server determines the at least two component groups in the vehicle includes: The server receives, from the OTA upgrade master node, group information for indicating the at least two component groups.

The foregoing implementation describes a manner of determining a plurality of component groups. The OTA upgrade master node may send group information of a component in the vehicle to the server, so that the server determines the at least two component groups based on the group information. Further, the at least two component groups may be determined by the OTA upgrade master node based on at least one of a preconfigured policy, a node connection relationship in the vehicle, a configuration of each node, load, and the like.

In another embodiment of the first aspect, that the server determines the at least two component groups in the vehicle includes: The server queries component group information based on an identifier of the vehicle, and determines the at least two component groups in the vehicle based on a query result. Further, the component group information may be preconfigured in the server, or may be preconfigured in a network side device.

The foregoing embodiment describes another manner of determining a plurality of component groups. The server may query the group information based on the identifier of the vehicle. Because component group information of a vehicle of a specific model may be preconfigured or predefined, the server may query the component group information based on the identifier of the vehicle (for example, a vehicle identification number of the vehicle or a model of the vehicle), to determine the component groups of the vehicle.

In another embodiment of the first aspect, before the server generates the first upgrade package for the first component group in the at least two component groups, the method further includes:

the server receives a first message from the OTA upgrade master node, where the first message includes version information for indicating components in the at least two component groups.

That the server generates the first upgrade package for the first component group in the at least two component groups includes:

the server generates the first upgrade package for the first component group in the at least two component groups based on the version information of the components in the at least two component groups.

The version information of the component may include one or more of software version information of the component, calibration data version information, hardware version information (for example, a specification of hardware, a model, or an identifier of hardware, where software that needs to be upgraded based on version information of different hardware may be different), an identifier (ID) of the component, a version number of the component, and the like. For example, a camera of the vehicle includes a camera program, and a program version number "v12.5.8" of the camera program may be version information of the camera. For another example, specifications and models of a main control chip and a photosensitive chip in the camera may also be version information of the camera.

It can be learned that the server determines the first upgrade package based on the version information of the component. Further, the server may determine, based on version information of the component in the first component group, that a component whose version needs to be upgraded exists in the first component group, to package upgrade data to obtain the first upgrade package.

According to a second aspect, an embodiment of this application discloses a vehicle upgrade method, including:

an OTA upgrade master node sends a first message to a server, where the first message is used to indicate version information of components in at least two component groups in a vehicle;

the OTA upgrade master node receives a first download address that is used to download a first upgrade package and that is sent by the server, where the first upgrade package is used to upgrade a first component group in the at least two component groups in the vehicle, and the first component group includes a first upgrade control component configured to control a component in the first component group to perform OTA upgrade; and the OTA upgrade master node sends the first download address to the first upgrade control component. Further, the OTA upgrade master node may be deployed in the vehicle.

In this embodiment of this application, the OTA upgrade master node reports the version information of the component in the vehicle to the server, and the server may determine, based on the version information, a component that needs to be upgraded, and generate an upgrade package. A download address is allocated to the upgrade package, and the OTA upgrade master node distributes the download address to an upgrade control component in a component group, so that the upgrade control component downloads the corresponding upgrade package to upgrade the component in the component group. In this way, upgrade packages for component groups may be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment of the second aspect, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another embodiment of the second aspect, the first message is further used to indicate group information of the at least two component groups.

It can be learned that the OTA upgrade master node may send group information of a component in the vehicle to the server, so that the server determines the at least two component groups based on the group information. Further, the group information may be determined by the OTA upgrade master node based on at least one of a preconfigured policy, a node connection relationship in the vehicle, a configuration of each node, load, and the like.

In another embodiment of the second aspect, the method further includes:

the OTA upgrade master node receives version information that is of at least one component in the vehicle and that is sent by a report node.

The report node may be a domain controller, a gateway, a distributed gateway, a vehicle integration unit, or the like in the vehicle. The report node may report, to the OTA upgrade master node, the version information of the component collected by the report node. For example, a cockpit domain controller (CDC) may collect version information of a plurality of components (for example, one or more of a microphone, a radar, a speaker, and a keyless start module) in a cockpit domain, and then may send the version information to the OTA upgrade master node. Subsequently, the OTA upgrade master node may send the version information to the server, to determine a component that needs to be updated.

In another embodiment of the second aspect, the method further includes:

the OTA upgrade master node determines the at least two component groups in the vehicle.

Further, the at least two component groups may be determined by the OTA upgrade master node based on at least one of a preconfigured policy, a node connection relationship in the vehicle, a configuration of each node, load, and the like. For example, the OTA upgrade master node may group a plurality of components with functions in one area into one component group, and then determine, based on a load status of a control component (for example, a domain controller DC and a vehicle integration unit VIU) with a centralized computing capability in the component group, whether to set a control component as an upgrade control component. For another example, an upgrade control component may be first determined based on a configuration of each component, and then components close to the upgrade control component are used as a component group. Specifically, for example, the upgrade control component needs to establish a secure channel with the server based on a security certificate. In this case, only a component in which the security certificate is deployed is qualified to be determined as the upgrade control component. For another example, an upgrade control component needs to establish a connection to the server. Therefore, if load of a current node is relatively high, the current node is not suitable to be determined as the upgrade control component.

In another embodiment of the second aspect, the method further includes:

the OTA upgrade master node receives version information of the component in the first component group from the first upgrade control component.

It can be learned that the first upgrade control component may collect the version information of the component in the group and send the version information to the OTA upgrade master node. Subsequently, the OTA upgrade master node may send the version information to the server, to determine a component that needs to be updated.

In another embodiment of the second aspect, the first upgrade control component is a domain controller DC or a vehicle integration unit VIU.

In another embodiment of the second aspect, load of the first upgrade control component is less than or equal to a first threshold; and/or a security certificate is deployed in the first upgrade control component.

According to a third aspect, an embodiment of this application discloses a vehicle upgrade method, including:

a first upgrade control component receives a first upgrade package sent by a server, where the first upgrade package is used to perform OTA upgrade for a component in a first component group; and the first upgrade control component controls, based on the first upgrade package, the component in the first component group to perform OTA upgrade. Further, the method is applied to the first upgrade control component in a vehicle, the first upgrade control component is configured to control the component in the first component group to perform OTA upgrade, and the first component group is one of at least two component groups in the vehicle.

In this embodiment of this application, the server generates an upgrade package of a component group for the component group in the vehicle, and then distributes the upgrade package to an upgrade control component in the component group, so that the upgrade control component upgrades a component in the component group. In this way, each upgrade control component may download an upgrade package for a component group to which the upgrade control component belongs, and upgrade packages for component groups may further be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade component in each component group controls the component in the group to perform upgrade, and can monitor, detect, and command upgrade in a timely manner. Therefore, upgrade of the component can be completed as soon as possible, and vehicle stability can be improved.

That the first upgrade control component controls the component in the first component group to perform an upgrade-related operation such as check, decompression, decoding, data distribution in the component group, program downloading, program installation, or setting on data in the first upgrade package may be considered as that the first upgrade control component controls the component in the first component group to perform upgrade.

In an embodiment of the third aspect, before the first upgrade control component receives the first upgrade package sent by the server, the method further includes:

the first upgrade control component sends version information of the component in the first component group to an OTA upgrade master node in the vehicle.

It can be learned that the first upgrade control component may collect the version information of the component in the group and send the version information to the OTA upgrade master node. Subsequently, the OTA upgrade master node may send the version information to the server, to determine a component that needs to be updated.

In another embodiment of the third aspect, before the first upgrade control component receives the first upgrade package sent by the server, the method further includes:

the first upgrade control component receives a first download address that is sent by the OTA upgrade master node and that is used to download the first upgrade package; and the first upgrade control component establishes a first secure channel with the server based on the first download address, where the first secure channel is used to download the first upgrade package.

That the first upgrade control component receives the first upgrade package sent by the server includes:

the first upgrade control component receives, through the first secure channel, the first upgrade package sent by the server.

The foregoing describes a manner of downloading an upgrade data package. The OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the server directly establishes a connection to a vehicle upgrade apparatus in the group to send the download address, network resource overheads can be reduced, complexity can be reduced, and upgrade efficiency can be improved.

In another embodiment of the third aspect, the first upgrade package is signed by the server; and that the first upgrade control component controls, based on the first upgrade package, the component in the first component group to perform OTA upgrade includes:

the first upgrade control component verifies a signature of the first upgrade package; and in response to that the verification on the signature succeeds, the first upgrade control component controls, based on the first upgrade package, the component in the first component group to perform OTA upgrade.

It can be learned that before upgrade, the first upgrade control component first verifies a source of the data package based on the signature, to avoid establishing a connection to an untrusted server, thereby improving security in a vehicle upgrade process.

According to a fourth aspect, an embodiment of this application discloses a vehicle upgrade method, including:

an OTA upgrade master node in a vehicle sends a first message to a server, where the first message is used to indicate version information of components in at least two component groups in the vehicle; and a first upgrade control component in the vehicle downloads a first upgrade package from the server, where the first upgrade package is used to upgrade a first component group in the at least two component groups, and the first upgrade control component is configured to control a component in the first component group to perform OTA upgrade. Further, the vehicle upgrade method may be applied to the vehicle, the vehicle includes the at least two component groups, and each of the at least two component groups includes one upgrade control component configured to control a component in the component group to perform OTA upgrade.

In this embodiment of this application, the server generates an upgrade package of a component group for the component group in the vehicle, and then distributes the upgrade package to an upgrade control component in the component group, so that the upgrade control component upgrades a component in the component group. In this way, each upgrade control component may download an upgrade package for a component group to which the upgrade control component belongs, and upgrade packages for component groups may further be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment of the fourth aspect, the method further includes:

the OTA upgrade master node in the vehicle receives a first download address that is used to download the first upgrade package and that is sent by the server, where the first upgrade package is used to upgrade the first component group in the at least two component groups in the vehicle, and the first component group includes the first upgrade control component configured to control the component in the first component group to perform OTA upgrade; and the OTA upgrade master node in the vehicle sends the first download address to the first upgrade control component in the vehicle.

In an embodiment of the fourth aspect, the method further includes:

the first upgrade control component in the vehicle receives the first download address that is sent by the OTA upgrade master node and that is used to download the first upgrade package;

the first upgrade control component in the vehicle establishes a first secure channel with the server based on the first download address; and the first upgrade control component in the vehicle receives, through the first secure channel, the first upgrade package sent by the server.

The foregoing describes a manner of downloading an upgrade data package. The OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the server directly establishes a connection to a vehicle upgrade apparatus in the group to send the download address, network resource overheads can be reduced, complexity can be reduced, and upgrade efficiency can be improved.

In another embodiment of the fourth aspect, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another embodiment of the fourth aspect, the first message is further used to indicate group information of the at least two component groups.

It can be learned that the OTA upgrade master node may send group information of a component in the vehicle to the server, so that the server determines the at least two component groups based on the group information. Further, the group information may be determined by the OTA upgrade master node based on at least one of a preconfigured policy, a node connection relationship in the vehicle, a configuration of each node, load, and the like.

In another embodiment of the fourth aspect, the method further includes:

the OTA upgrade master node in the vehicle receives version information of the component in the first component group from the first upgrade control component.

It can be learned that the first upgrade control component may collect the version information of the component in the group and send the version information to the OTA upgrade master node. Subsequently, the OTA upgrade master node may send the version information to the server, to determine a component that needs to be updated.

In another embodiment of the fourth aspect, the first upgrade package is signed by the server, and the method further includes:

the first upgrade control component in the vehicle verifies a signature of the first upgrade package; and in response to that the verification on the signature succeeds, the first upgrade control component in the vehicle controls, based on the first upgrade package, the component in the first component group to perform OTA upgrade.

It can be learned that before upgrade, the upgrade control component first verifies a source of the data package based on the signature, to avoid establishing a connection to an untrusted server, thereby improving security in a vehicle upgrade process.

According to a fifth aspect, an embodiment of this application discloses a vehicle upgrade method, including:

a server receives a first message from an OTA upgrade master node in a vehicle, where the first message is used to indicate version information of components in at least two component groups in the vehicle, and each of the at least two component groups includes one upgrade control component configured to control a component in the component group to perform OTA upgrade;

the server generates a first upgrade package for a first component group in the at least two component groups based on the version information of the components in the at least two component groups; and the server sends the first upgrade package to a first upgrade control component in the vehicle, where the first upgrade package is used to perform OTA upgrade for a component in the first component group, and the first upgrade control component is configured to control the component in the first component group to perform OTA upgrade.

In this embodiment of this application, the server generates an upgrade package of a component group for the component group in the vehicle, and then distributes the upgrade package to an upgrade control component in the component group, so that the upgrade control component upgrades a component in the component group. The server generates an upgrade package of a component group for the component group in the vehicle, and then distributes the upgrade package to an upgrade control component in the component group, so that the upgrade control component upgrades a component in the component group. Compared with that in a case in which one OTA upgrade master module performs upgrade control on all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment of the fifth aspect, after the server generates the first upgrade package for the first component group in the at least two component groups based on the version information of the components in the at least two component groups, the method further includes:

the server allocates a first download address for downloading the first upgrade package; and the server sends the first download address to the OTA upgrade master node in the vehicle.

That the server sends the first upgrade package to the first upgrade control component in the vehicle includes:

the server establishes, with the first upgrade control component in the vehicle, a first secure channel for downloading the first upgrade package; and the server sends the first upgrade package to the first upgrade control component through the first secure channel.

The foregoing describes a manner of downloading an upgrade data package. The server may allocate a download address to the first upgrade package. The download address may be first sent to the OTA upgrade master node, and then the OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the server directly establishes a connection to a vehicle upgrade apparatus in the group to send the download address, network resource overheads can be reduced, complexity can be reduced, and upgrade efficiency can be improved.

In another embodiment of the fifth aspect, the first secure channel includes at least a hypertext transfer protocol secure HTTPS secure channel, a transport layer security TLS secure channel, or a datagram transport layer security DTLS secure channel.

In another embodiment of the fifth aspect, that the server determines the at least two component groups in the vehicle includes: The server receives, from the OTA upgrade master node, group information for indicating the at least two component groups.

The foregoing embodiment describes a manner of determining a plurality of component groups. The OTA upgrade master node may send group information of a component in the vehicle to the server, so that the server determines the at least two component groups based on the group information. Further, the at least two component groups may be determined by the OTA upgrade master node based on at least one of a preconfigured policy, a node connection relationship in the vehicle, a configuration of each node, load, and the like.

In another embodiment of the fifth aspect, that the server determines the at least two component groups in the vehicle includes: The server queries, based on an identifier of the vehicle, component group information preconfigured in the server, and determines the at least two component groups in the vehicle based on a query result.

The foregoing embodiment describes another manner of determining a plurality of component groups. The server may query the group information based on the identifier of the vehicle. Because component group information of a vehicle of a specific model may be preconfigured or predefined, the server may query the component group information based on the identifier of the vehicle (for example, a vehicle identification number of the vehicle or a model of the vehicle), to determine the component groups of the vehicle.

In another embodiment of the fifth aspect, before the server generates the first upgrade package for the first component group in the at least two component groups, the method further includes:

the server receives a first message from the OTA upgrade master node, where the first message includes version information for indicating components in the at least two component groups.

That the server generates the first upgrade package for the first component group in the at least two component groups includes:

the server generates the first upgrade package for the first component group in the at least two component groups based on the version information of the components in the at least two component groups.

It can be learned that the server determines the first upgrade package based on the version information of the component. Further, the server may determine, based on version information of the component in the first component group, that a component whose version needs to be upgraded exists in the first component group, to package upgrade data to obtain the first upgrade package.

According to a sixth aspect, an embodiment of this application discloses a vehicle upgrade method, including:

an OTA upgrade master node receives version information of a component in a first component group from a first upgrade control component, where the first component group is one of at least two component groups in a vehicle, and the first upgrade control component is configured to control the component in the first component group to perform OTA upgrade; and the OTA upgrade master node sends, to the first upgrade control component, a first download address for downloading a first upgrade package, where the first upgrade package is used to perform OTA upgrade for the component in the first component group. Further, the OTA upgrade master node is deployed in the vehicle.

In this embodiment of this application, the OTA upgrade master node collects version information of a plurality of components in the vehicle. The version information may be used to determine a component that needs to be upgraded, and generate an upgrade package. A download address is allocated to the upgrade package, and the OTA upgrade master node distributes the download address to an upgrade control component in a component group, so that the upgrade control component downloads the corresponding upgrade package to upgrade the component in the component group. In this way, upgrade packages for component groups may be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment of the sixth aspect, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another embodiment of the sixth aspect, the first upgrade control component is a domain controller DC or a vehicle integration unit VIU.

In another embodiment of the sixth aspect, load of the first upgrade control component is less than or equal to a first threshold; and/or a security certificate is deployed in the first upgrade control component.

According to a seventh aspect, an embodiment of this application discloses a vehicle upgrade method, including:

a first upgrade control component sends version information of a component in a first component group to an OTA upgrade master node in a vehicle; and the first upgrade control component receives a first download address that is sent by the OTA upgrade master node and that is used to download a first upgrade package, where the first upgrade package is used to perform OTA upgrade for the component in the first component group. Further, the first upgrade control component is configured to control the component in the first component group to perform OTA upgrade, and the first component group is one of at least two component groups in the vehicle.

In this embodiment of this application, each upgrade control component receives a download address from the OTA upgrade master node, and downloads, based on the download address, an upgrade package for a component group to which the upgrade control component belongs, and upgrade packages for component groups may further be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

According to an eighth aspect, an embodiment of this application discloses a vehicle upgrade apparatus, including:

a processing unit, configured to determine at least two component groups in a vehicle, where each component group includes one upgrade control component configured to control a component in the component group to perform OTA upgrade, where the processing unit is further configured to generate a first upgrade package for a first component group in the at least two component groups, where an upgrade control component in the first component group is a first upgrade control component; and a sending unit, configured to send the first upgrade package to the first upgrade control component, where the first upgrade package is used to upgrade a component in the first component group. Further, optionally, the vehicle upgrade apparatus may be deployed in a server.

In this embodiment of this application, the vehicle upgrade apparatus generates an upgrade package of a component group for the component group in the vehicle, and then distributes the upgrade package to an upgrade control component in the component group, so that the upgrade control component upgrades a component in the component group. Compared with that in a case in which one OTA upgrade master module performs upgrade control on all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment of the eighth aspect, the processing unit is further configured to allocate a first download address for downloading the first upgrade package;

the sending unit is further configured to send the first download address to an OTA upgrade master node in the vehicle;

the processing unit is further configured to establish, with the first upgrade control component, a first secure channel for downloading the first upgrade package; and the sending unit is further configured to send the first upgrade package to the first upgrade control component through the first secure channel.

The foregoing describes a manner of downloading an upgrade data package. The vehicle upgrade apparatus may allocate a download address to the first upgrade package. The download address may be first sent to the OTA upgrade master node, and then the OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the vehicle upgrade apparatus directly establishes a connection to the upgrade control component in the group to send the download address, network resource overheads can be reduced, complexity can be reduced, and upgrade efficiency can be improved.

In another embodiment of the eighth aspect, the first secure channel includes at least a hypertext transfer protocol secure HTTPS secure channel, a transport layer security TLS secure channel, or a datagram transport layer security DTLS secure channel.

In another embodiment of the eighth aspect, the apparatus further includes a receiving unit, and the receiving unit is configured to receive, from the OTA upgrade master node by using the receiving unit, group information for indicating the at least two component groups.

The foregoing embodiment describes a manner of determining a plurality of component groups. The OTA upgrade master node may send group information of a component in the vehicle to the vehicle upgrade apparatus, so that the vehicle upgrade apparatus determines the at least two component groups based on the group information. Further, the at least two component groups may be determined by the OTA upgrade master node based on at least one of a preconfigured policy, a node connection relationship in the vehicle, a configuration of each node, load, and the like.

In another embodiment of the eighth aspect, the processing unit is further configured to: query, based on an identifier of the vehicle, component group information preconfigured in the vehicle upgrade apparatus, and determine the at least two component groups in the vehicle based on a query result.

The foregoing embodiment describes another manner of determining a plurality of component groups. The vehicle upgrade apparatus may query the group information based on the identifier of the vehicle. Because component group information of a vehicle of a specific model may be preconfigured or predefined, the vehicle upgrade apparatus may query the component group information based on the identifier of the vehicle (for example, a vehicle identification number of the vehicle or a model of the vehicle), to determine the component groups of the vehicle.

In another embodiment of the eighth aspect, the receiving unit is further configured to receive a first message from the OTA upgrade master node, where the first message includes version information for indicating components in the at least two component groups; and the processing unit is further configured to generate the first upgrade package for the first component group in the at least two component groups based on the version information of the components in the at least two component groups.

It can be learned that the vehicle upgrade apparatus determines the first upgrade package based on the version information of the component. Further, the vehicle upgrade apparatus may determine, based on version information of the component in the first component group, that a component whose version needs to be upgraded exists in the first component group, to package upgrade data to obtain the first upgrade package.

According to a ninth aspect, an embodiment of this application discloses a vehicle upgrade apparatus, including:

a sending unit, configured to send a first message to a server, where the first message is used to indicate version information of components in at least two component groups in a vehicle; and a receiving unit, configured to receive a first download address that is used to download a first upgrade package and that is sent by the server, where the first upgrade package is used to upgrade a first component group in the at least two component groups in the vehicle, and the first component group includes a first upgrade control component configured to control a component in the first component group to perform OTA upgrade.

The sending unit is further configured to send the first download address to the first upgrade control component. Further, the vehicle upgrade apparatus may be deployed in the vehicle.

In this embodiment of this application, the vehicle upgrade apparatus reports the version information of the component in the vehicle to the server, and the server may determine, based on the version information, a component that needs to be upgraded, and generate an upgrade package. A download address is allocated to the upgrade package, and the vehicle upgrade apparatus distributes the download address to an upgrade control component in a component group, so that the upgrade control component downloads the corresponding upgrade package to upgrade the component in the component group. In this way, upgrade packages for component groups may be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment of the ninth aspect, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another embodiment of the ninth aspect, the first message is further used to indicate group information of the at least two component groups.

It can be learned that the vehicle upgrade apparatus may send group information of a component in the vehicle to the server, so that the server determines the at least two component groups based on the group information. Further, the group information may be determined by the vehicle upgrade apparatus based on at least one of a preconfigured policy, a node connection relationship in the vehicle, a configuration of each node, load, and the like.

In another embodiment of the ninth aspect, the receiving unit is further configured to receive version information that is of at least one component in the vehicle and that is sent by a report node.

The report node may be a domain controller, a gateway, a distributed gateway, a vehicle integration unit, or the like in the vehicle. The report node may report, to the vehicle upgrade apparatus, the version information of the component collected by the report node. For example, a cockpit domain controller (CDC) may collect version information of a plurality of components (for example, one or more of a microphone, a radar, a speaker, and a keyless start module) in a cockpit domain, and then may send the version information to the vehicle upgrade apparatus. Subsequently, the vehicle upgrade apparatus may send the version information to the server, to determine a component that needs to be updated.

In another embodiment of the ninth aspect, the apparatus further includes a processing unit, configured to determine the at least two component groups in the vehicle.

Further, the at least two component groups may be determined by the vehicle upgrade apparatus based on at least one of a preconfigured policy, a node connection relationship in the vehicle, a configuration of each node, load, and the like. For example, the vehicle upgrade apparatus may group a plurality of components with functions in one area into one component group, and then determine, based on a load status of a control component (for example, a domain controller DC and a vehicle integration unit VIU) with a centralized computing capability in the component group, whether to set a control component as an upgrade control component. For another example, an upgrade control component may be first determined based on a configuration of each component, and then components close to the upgrade control component are used as a component group. Specifically, for example, the upgrade control component needs to establish a secure channel with the server based on a security certificate. In this case, only a component in which the security certificate is deployed is qualified to be determined as the upgrade control component. For another example, an upgrade control component needs to establish a connection to the server. Therefore, if load of a current node is relatively high, the current node is not suitable to be determined as the upgrade control component.

In another embodiment of the ninth aspect, the receiving unit is further configured to receive version information of the component in the first component group from the first upgrade control component.

It can be learned that the first upgrade control component may collect the version information of the component in the group and send the version information to the vehicle upgrade apparatus. Subsequently, the vehicle upgrade apparatus may send the version information to the server, to determine a component that needs to be updated.

In another embodiment of the ninth aspect, the first upgrade control component is a domain controller DC or a vehicle integration unit VIU.

In another embodiment of the ninth aspect, load of the first upgrade control component is less than or equal to a first threshold; and/or a security certificate is deployed in the first upgrade control component.

According to a tenth aspect, an embodiment of this application discloses a vehicle upgrade apparatus, including:

a receiving unit, configured to receive a first upgrade package sent by a server, where the first upgrade package is used to perform OTA upgrade for a component in a first component group; and a processing unit, configured to control, based on the first upgrade package, the component in the first component group to perform OTA upgrade. Further, the vehicle upgrade apparatus is used in a vehicle, the vehicle upgrade apparatus is configured to control the component in the first component group to perform OTA upgrade, and the first component group is one of at least two component groups in the vehicle.

In this embodiment of this application, the server generates the first upgrade package of the first component group for the component group in the vehicle, and then sends the first upgrade package to the vehicle upgrade apparatus, so that the vehicle upgrade apparatus upgrades the component in the component group. In this way, a vehicle upgrade apparatus in each group may download an upgrade package for the component group to which the vehicle upgrade apparatus belongs, and upgrade packages for component groups may further be downloaded at the same time, so that vehicle upgrade apparatuses in all groups perform upgrade at the same time. Compared with that in a case in which one OTA upgrade master module upgrades all components in the vehicle, vehicle upgrade efficiency is improved. Further, each component may be upgraded by a close vehicle upgrade apparatus in a group, so that vehicle upgrade complexity is reduced. In addition, the vehicle upgrade apparatus in each component group controls the component in the group to perform upgrade, and can monitor, detect, and command upgrade in a timely manner. Therefore, upgrade of the component can be completed as soon as possible, and vehicle stability can be improved.

In an embodiment of the tenth aspect, the apparatus further includes a sending unit, configured to send version information of the component in the first component group to an OTA upgrade master node in the vehicle.

It can be learned that the vehicle upgrade apparatus may collect the version information of the component in the group and send the version information to the OTA upgrade master node. Subsequently, the OTA upgrade master node may send the version information to the server, to determine a component that needs to be updated.

In another embodiment of the tenth aspect, the receiving unit is further configured to receive a first download address that is sent by the OTA upgrade master node and that is used to download the first upgrade package;

the processing unit is further configured to establish a first secure channel with the server based on the first download address, where the first secure channel is used to download the first upgrade package; and the receiving unit is further configured to receive, through the first secure channel, the first upgrade package sent by the server.

The foregoing describes a manner of downloading an upgrade data package. The OTA upgrade master node distributes the download address to the vehicle upgrade apparatus that needs the first upgrade package to complete upgrade. Because a data size of the download address is usually small, the download address is first sent to the upgrade master node and then distributed to a corresponding vehicle upgrade apparatus in each group. Compared with that in a case in which the server directly establishes a connection to a vehicle upgrade apparatus in the group to send the download address, network resource overheads can be reduced, complexity can be reduced, and upgrade efficiency can be improved.

In another embodiment of the tenth aspect, the first upgrade package is signed by the server; and the processing unit is further configured to verify a signature of the first upgrade package;

the processing unit is further configured to: in response to that the verification on the signature succeeds, control, based on the first upgrade package, the component in the first component group to perform OTA upgrade.

It can be learned that before upgrade, the upgrade control apparatus first verifies a source of the data package based on the signature, to avoid establishing a connection to an untrusted server, thereby improving security in a vehicle upgrade process.

According to an eleventh aspect, an embodiment of this application discloses a vehicle. The vehicle includes an OTA upgrade master node and at least two component groups, and each of the at least two component groups includes one upgrade control component configured to control a component in the component group to perform OTA upgrade.

An OTA upgrade master node in the vehicle is configured to send a first message to a server, where the first message is used to indicate version information of components in the at least two component groups in the vehicle.

A first upgrade control component in the vehicle is configured to download a first upgrade package from the server, where the first upgrade package is used to upgrade a first component group in the at least two component groups, and the first upgrade control component is configured to control a component in the first component group to perform OTA upgrade.

In this embodiment of this application, the server generates an upgrade package of a component group for the component group in the vehicle, and then distributes the upgrade package to an upgrade control component in the component group, so that the upgrade control component upgrades a component in the component group. In this way, each upgrade control component may download an upgrade package for a component group to which the upgrade control component belongs, and upgrade packages for component groups may further be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade component in each component group controls the component in the group, and can monitor, detect, and command upgrade in a timely manner. Therefore, upgrade of the component can be completed as soon as possible, and vehicle stability can be improved.

In an embodiment of the eleventh aspect, the OTA upgrade master node in the vehicle is further configured to:

receive a first download address that is used to download the first upgrade package and that is sent by the server, where the first upgrade package is used to upgrade the first component group in the at least two component groups in the vehicle, and the first component group includes the first upgrade control component configured to control the component in the first component group to perform OTA upgrade; and send the first download address to the first upgrade control component in the vehicle.

In an embodiment of the eleventh aspect, the first upgrade control component in the vehicle is further configured to:

receive the first download address that is sent by the OTA upgrade master node and that is used to download the first upgrade package;

establish a first secure channel with the server based on the first download address; and receive, through the first secure channel, the first upgrade package sent by the server.

The foregoing describes a manner of downloading an upgrade data package. The OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the server directly establishes a connection to a vehicle upgrade apparatus in the group to send the download address, network resource overheads can be reduced, complexity can be reduced, and upgrade efficiency can be improved.

In another embodiment of the eleventh aspect, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another embodiment of the eleventh aspect, the first message is further used to indicate group information of the at least two component groups.

It can be learned that the OTA upgrade master node may send group information of a component in the vehicle to the server, so that the server determines the at least two component groups based on the group information. Further, the group information may be determined by the OTA upgrade master node based on at least one of a preconfigured policy, a node connection relationship in the vehicle, a configuration of each node, load, and the like.

In another embodiment of the eleventh aspect, the OTA upgrade master node in the vehicle is further configured to:

receive version information of the component in the first component group from the first upgrade control component.

It can be learned that the first upgrade control component may collect the version information of the component in the group and send the version information to the OTA upgrade master node. Subsequently, the OTA upgrade master node may send the version information to the server, to determine a component that needs to be updated.

In another embodiment of the eleventh aspect, the first upgrade package is signed by the server, and the first upgrade control component in the vehicle is further configured to:

verify a signature of the first upgrade package; and in response to that the verification on the signature succeeds, control, based on the first upgrade package, the component in the first component group to perform OTA upgrade.

It can be learned that before upgrade, the upgrade control component first verifies a source of the data package based on the signature, to avoid establishing a connection to an untrusted server, thereby improving security in a vehicle upgrade process.

According to a twelfth aspect, an embodiment of this application discloses a vehicle upgrade apparatus, including:

a receiving unit, configured to receive a first message from an OTA upgrade master node in a vehicle, where the first message is used to indicate version information of components in at least two component groups in the vehicle, and each of the at least two component groups includes one upgrade control component configured to control a component in the component group to perform OTA upgrade;

a processing unit, configured to generate a first upgrade package for a first component group in the at least two component groups based on the version information of the components in the at least two component groups; and a sending unit, configured to send the first upgrade package to a first upgrade control component in the vehicle, where the first upgrade package is used to perform OTA upgrade for a component in the first component group, and the first upgrade control component is configured to control the component in the first component group to perform OTA upgrade. Further, optionally, the vehicle upgrade apparatus may be deployed in a server.

In this embodiment of this application, the vehicle upgrade apparatus generates an upgrade package of a component group for the component group in the vehicle, and then distributes the upgrade package to an upgrade control component in the component group, so that the upgrade control component upgrades a component in the component group. Compared with that in a case in which one OTA upgrade master module performs upgrade control on all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment of the twelfth aspect, the processing unit is further configured to allocate a first download address for downloading the first upgrade package;

the sending unit is further configured to send the first download address to the OTA upgrade master node in the vehicle;

the processing unit is further configured to establish, with the first upgrade control component in the vehicle, a first secure channel for downloading the first upgrade package; and the sending unit is further configured to send the first upgrade package to the first upgrade control component through the first secure channel.

The foregoing describes a manner of downloading an upgrade data package. The vehicle upgrade apparatus may allocate a download address to the first upgrade package. The download address may be first sent to the OTA upgrade master node, and then the OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the vehicle upgrade apparatus directly establishes a connection to the upgrade control component in the group to send the download address, network resource overheads can be reduced, complexity can be reduced, and upgrade efficiency can be improved.

In another embodiment of the twelfth aspect, the first secure channel includes at least a hypertext transfer protocol secure HTTPS secure channel, a transport layer security TLS secure channel, or a datagram transport layer security DTLS secure channel.

In another embodiment of the twelfth aspect, the receiving unit is further configured to receive, from the OTA upgrade master node by using the receiving unit, group information for indicating the at least two component groups.

The foregoing embodiment describes a manner of determining a plurality of component groups. The OTA upgrade master node may send group information of a component in the vehicle to the vehicle upgrade apparatus, so that the vehicle upgrade apparatus determines the at least two component groups based on the group information. Further, the at least two component groups may be determined by the OTA upgrade master node based on at least one of a preconfigured policy, a node connection relationship in the vehicle, a configuration of each node, load, and the like.

In another embodiment of the twelfth aspect, the processing unit is further configured to: query, based on an identifier of the vehicle, component group information preconfigured in the vehicle upgrade apparatus, and determine the at least two component groups in the vehicle based on a query result.

The foregoing embodiment describes another manner of determining a plurality of component groups. The vehicle upgrade apparatus may query the group information based on the identifier of the vehicle. Because component group information of a vehicle of a specific model may be preconfigured or predefined, the vehicle upgrade apparatus may query the component group information based on the identifier of the vehicle (for example, a vehicle identification number of the vehicle or a model of the vehicle), to determine the component groups of the vehicle.

In another embodiment of the twelfth aspect, the receiving unit is further configured to receive a first message from the OTA upgrade master node, where the first message includes version information for indicating components in the at least two component groups; and the processing unit is further configured to generate the first upgrade package for the first component group in the at least two component groups based on the version information of the components in the at least two component groups.

It can be learned that the vehicle upgrade apparatus determines the first upgrade package based on the version information of the component. Further, the vehicle upgrade apparatus may determine, based on version information of the component in the first component group, that a component whose version needs to be upgraded exists in the first component group, to package upgrade data to obtain the first upgrade package.

According to a thirteenth aspect, an embodiment of this application discloses a vehicle upgrade apparatus, including:

a receiving unit, configured to receive version information of a component in a first component group from a first upgrade control component, where the first component group is one of at least two component groups in a vehicle, and the first upgrade control component is configured to control the component in the first component group to perform OTA upgrade;

a processing unit, configured to generate a first upgrade package for the first component group in the at least two component groups based on version information of components in the at least two component groups, where an upgrade control component in the first component group is the first upgrade control component; and a sending unit, configured to send, to the first upgrade control component, a first download address for downloading the first upgrade package, where the first upgrade package is used to perform OTA upgrade for the component in the first component group. Further, the vehicle upgrade apparatus is deployed in the vehicle.

In this embodiment of this application, the vehicle upgrade apparatus collects version information of a plurality of components in the vehicle. The version information may be used to determine a component that needs to be upgraded, and generate an upgrade package. A download address is allocated to the upgrade package, and the vehicle upgrade apparatus distributes the download address to an upgrade control component in a component group, so that the upgrade control component downloads the corresponding upgrade package to upgrade the component in the component group. In this way, upgrade packages for component groups may be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment of the thirteenth aspect, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another embodiment of the thirteenth aspect, the first upgrade control component is a domain controller DC or a vehicle integration unit VIU.

In another embodiment of the thirteenth aspect, load of the first upgrade control component is less than or equal to a first threshold; and/or a security certificate is deployed in the first upgrade control component.

According to a fourteenth aspect, an embodiment of this application discloses a vehicle upgrade apparatus, including:

a sending unit, configured to send version information of a component in a first component group to an OTA upgrade master node in a vehicle; and a receiving unit, configured to receive a first download address that is sent by the OTA upgrade master node and that is used to download a first upgrade package, where the first upgrade package is used to perform OTA upgrade for the component in the first component group.

In this embodiment of this application, the vehicle upgrade apparatus receives a download address from the OTA upgrade master node, and downloads, based on the download address, an upgrade package for a component group to which the vehicle upgrade apparatus belongs, and upgrade packages for component groups may further be downloaded at the same time, so that vehicle upgrade apparatuses in all groups perform upgrade at the same time. Compared with that in a case in which one OTA upgrade master module upgrades all components in the vehicle, vehicle upgrade efficiency is improved. Further, each component may be upgraded by a close vehicle upgrade apparatus in a group, so that vehicle upgrade complexity is reduced. In addition, the vehicle upgrade apparatus in each component group controls the component in the group to perform upgrade, and can monitor, detect, and command upgrade in a timely manner. Therefore, upgrade of the component can be completed as soon as possible, and vehicle stability can be improved.

According to a fifteenth aspect, an embodiment of this application further provides a server. The server includes at least one processor and a communications interface, the communications interface is configured to send and/or receive data, and the at least one processor is configured to invoke a computer program stored in at least one memory, so that the server implements the method according to any one of the first aspect or the possible implementations of the first aspect, or implements the method according to any one of the fifth aspect or the possible implementations of the fifth aspect.

According to a sixteenth aspect, an embodiment of this application further provides an OTA upgrade master node. The upgrade master node includes at least one processor and a communications interface, the communications interface is configured to send and/or receive data, and the at least one processor is configured to invoke a computer program stored in at least one memory, so that the upgrade master node implements the method according to any one of the second aspect or the possible implementations of the second aspect.

According to a seventeenth aspect, an embodiment of this application further provides a first group controller. The first group controller includes at least one processor and a communications interface, the communications interface is configured to send and/or receive data, and the at least one processor is configured to invoke a computer program stored in at least one memory, so that the first group controller implements the method according to any one of the third aspect or the possible implementations of the third aspect.

According to an eighteenth aspect, an embodiment of this application further provides a vehicle upgrade system. The vehicle upgrade system includes a server, an OTA upgrade master node, and a first upgrade control component. The server includes the vehicle upgrade apparatus according to any one of the eighth aspect or the possible implementations of the eighth aspect. The OTA upgrade master node includes the vehicle upgrade apparatus according to any one of the ninth aspect or the possible implementations of the ninth aspect. The first upgrade control component includes the vehicle upgrade apparatus according to any one of the tenth aspect or the possible implementations of the tenth aspect.

According to a nineteenth aspect, an embodiment of this application further provides a vehicle upgrade system. The vehicle upgrade system includes a server and a vehicle. Further, the vehicle further includes an OTA upgrade master node and a first upgrade control component. The server includes the vehicle upgrade apparatus according to any one of the twelfth aspect or the possible implementations of the twelfth aspect, and the vehicle is the vehicle according to any one of the eleventh aspect or the possible implementations of the eleventh aspect.

According to a twentieth aspect, an embodiment of this application further provides a vehicle upgrade system. The vehicle upgrade system includes an OTA upgrade master node and a first upgrade control component. The OTA upgrade master node includes the vehicle upgrade apparatus according to any one of the thirteenth aspect or the possible implementations of the thirteenth aspect, and the first upgrade control component includes the vehicle upgrade apparatus according to any one of the fourteenth aspect or the possible implementations of the fourteenth aspect.

According to a twenty-first aspect, an embodiment of this application discloses a computer-readable storage medium. The computer-readable storage medium stores a computer program, and when the computer program is run on one or more processors, the method according to any one of the first aspect or the possible implementations of the first aspect is implemented, or the method according to any one of the fifth aspect or the possible implementations of the fifth aspect is implemented; the method according to any one of the second aspect or the possible implementations of the second aspect is implemented, or the method according to any one of the sixth aspect or the possible implementations of the sixth aspect is implemented; the method according to any one of the third aspect or the possible implementations of the third aspect is implemented, or the method according to any one of the seventh aspect or the possible implementations of the seventh aspect is implemented; or the method according to any one of the fifth aspect or the possible implementations of the fifth aspect is implemented.

According to a twenty-second aspect, an embodiment of this application discloses a computer program product. When the computer program product runs on one or more processors, the method according to any one of the first aspect or the possible implementations of the first aspect is implemented, or the method according to any one of the fifth aspect or the possible implementations of the fifth aspect is implemented; the method according to any one of the second aspect or the possible implementations of the second aspect is implemented, or the method according to any one of the sixth aspect or the possible implementations of the sixth aspect is implemented; the method according to any one of the third aspect or the possible implementations of the third aspect is implemented, or the method according to any one of the seventh aspect or the possible implementations of the seventh aspect is implemented; or the method according to any one of the fifth aspect or the possible implementations of the fifth aspect is implemented.

According to a twenty-third aspect, an embodiment of this application discloses a chip system. The chip system includes at least one processor, a memory, and an interface circuit. The interface circuit is configured to provide information input/output for the at least one processor, and the memory stores a computer program. When the computer program is run on one or more processors, the method according to any one of the first aspect or the possible implementations of the first aspect is implemented, or the method according to any one of the fifth aspect or the possible implementations of the fifth aspect is implemented; the method according to any one of the second aspect or the possible implementations of the second aspect is implemented, or the method according to any one of the sixth aspect or the possible implementations of the sixth aspect is implemented; the method according to any one of the third aspect or the possible implementations of the third aspect is implemented, or the method according to any one of the seventh aspect or the possible implementations of the seventh aspect is implemented; or the method according to any one of the fifth aspect or the possible implementations of the fifth aspect is implemented.

According to a twenty-fourth aspect, an embodiment of this application discloses a terminal. The terminal may be a smart cockpit product, a vehicle, or the like. The terminal includes the vehicle upgrade apparatus according to any one of the ninth aspect or the possible implementations of the ninth aspect. Further, the vehicle upgrade apparatus according to any one of the tenth aspect or the possible implementations of the tenth aspect may be included.

Alternatively, the vehicle may be replaced with an intelligent terminal or an intelligent transportation vehicle such as a drone or a robot.

BRIEF DESCRIPTION OF DRAWINGS

The following describes accompanying drawings used in embodiments of this application.

DESCRIPTION OF EMBODIMENTS

The following describes embodiments of this application with reference to the accompanying drawings in embodiments of this application. It should be noted that in this application, the word such as "example" or "for example" is used to represent giving an example, an illustration, or a description. Any embodiment or design scheme described by using "example" or "for example" in this application shall not be construed as being more preferred or more advantageous than another embodiment or design scheme. Use of the word such as "example" or "for example" is intended to present a related concept in a specific manner.

The following first describes a system architecture and a service scenario in embodiments of this application. It should be noted that the system architecture and the service scenario described in this application are intended to describe the technical solutions in this application more clearly, but constitute no limitation on the technical solutions provided in this application. A person of ordinary skill in the art can learn that the technical solutions provided in this application are also applicable to a similar technical problem as the system architecture evolves and a new service scenario emerges.

Figure 1:
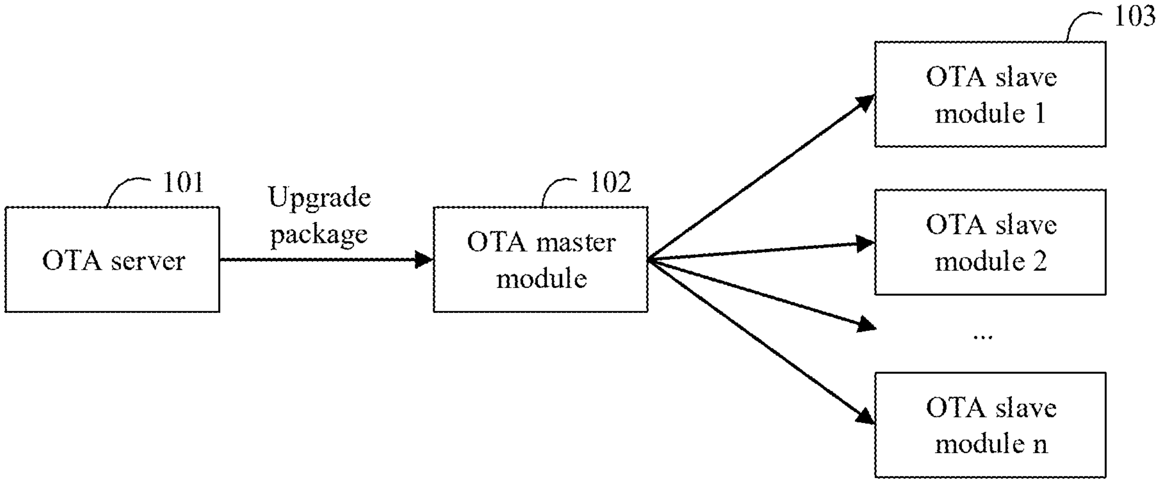
FIG. 1 is a schematic diagram of an architecture of a vehicle upgrade system according to an embodiment of this application.

FIG. 1 is a schematic diagram of a vehicle upgrade system according to an embodiment of this application. The vehicle upgrade system includes an OTA server 101, an OTA master module (Master) 102, and an OTA slave module (slave) 103.

The OTA server 101 is configured to send an upgrade data package to an OTA master. In some embodiments, the OTA server is also referred to as an OTA cloud.

The OTA master module (Master) 102 is an electronic device having data receiving and sending capabilities, and may receive an upgrade package sent by the OTA server 101, and update a component of a vehicle based on the upgrade package. Specifically, the OTA master module 102 distributes the received upgrade package to one or more OTA slave modules 103 in the vehicle, and instructs the one or more OTA slave modules 103 to install and activate the upgrade package, to complete upgrade.

Figure 2:
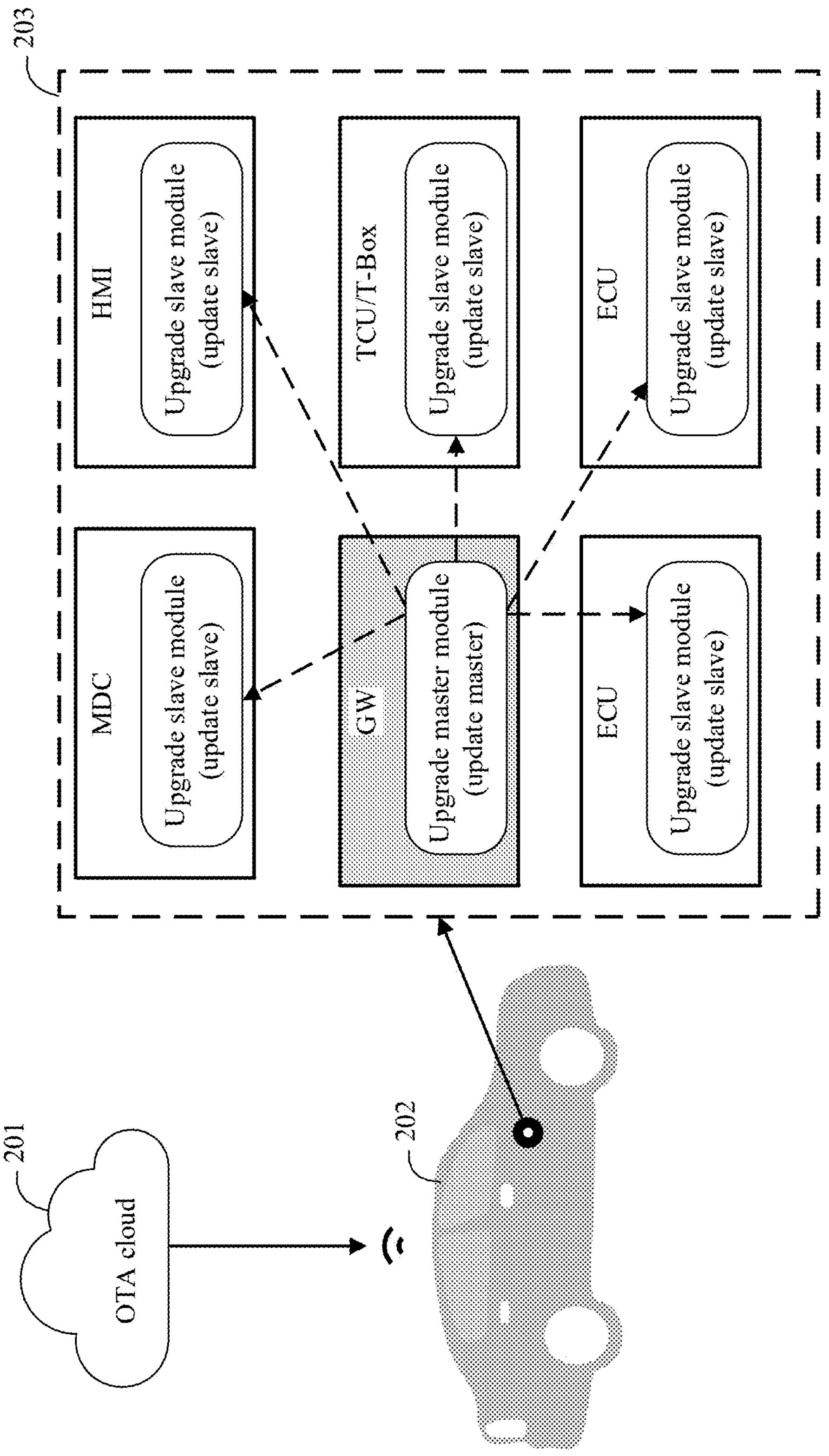
FIG. 2 is a schematic diagram of an architecture of a vehicle according to an embodiment of this application.

FIG. 2 is a schematic diagram of a possible architecture of a vehicle according to an embodiment of this application. The vehicle includes an OTA cloud 201 and a vehicle 202. The vehicle 202 is a vehicle based on a vehicle electrical/electronic architecture (E/E). As shown in an area 203, the vehicle 202 may include the following components: modules such as a mobile data center (MDC), a human-machine interaction (HMI), a gateway (GW), a telematics box (T-Box, or referred to as TCU), and an electronic control unit (ECU). The GW is a core component in the electrical/electronic architecture of the entire vehicle. As a data interaction hub of a network in the entire vehicle, the GW may route, in different networks, data of networks such as a controller area network (CAN), a local interconnect network (LIN), media oriented system transport (MOST), and FlexRay. The MDC is an intelligent in-vehicle computing platform of the vehicle. The T-Box is mainly configured to communicate with the outside of the vehicle, a background system, and a mobile phone application (APP). The HMI is an infotainment system of the vehicle. The ECU is a vehicle-special microcontroller.

An upgrade master module (update master, which may be considered as an OTA master) is deployed in the GW of the vehicle 202, and an upgrade slave module (update slave, which may be considered as an OTA slave) is deployed in each of remaining modules of the vehicle 202. The upgrade master module in the GW receives an upgrade package sent by the OTA cloud, and distributes the upgrade package to an upgrade slave module of a corresponding component, so that the upgrade slave module installs and activates the upgrade package, to complete component upgrade. It can be learned that the upgrade master module in the GW is responsible for downloading upgrade packages in the entire vehicle and instructing each component to perform installation. This brings a heavy burden to storage and load of the upgrade master module. For example, if an upgrade package is very large, storage space of the upgrade master module may be insufficient.

Figure 3:
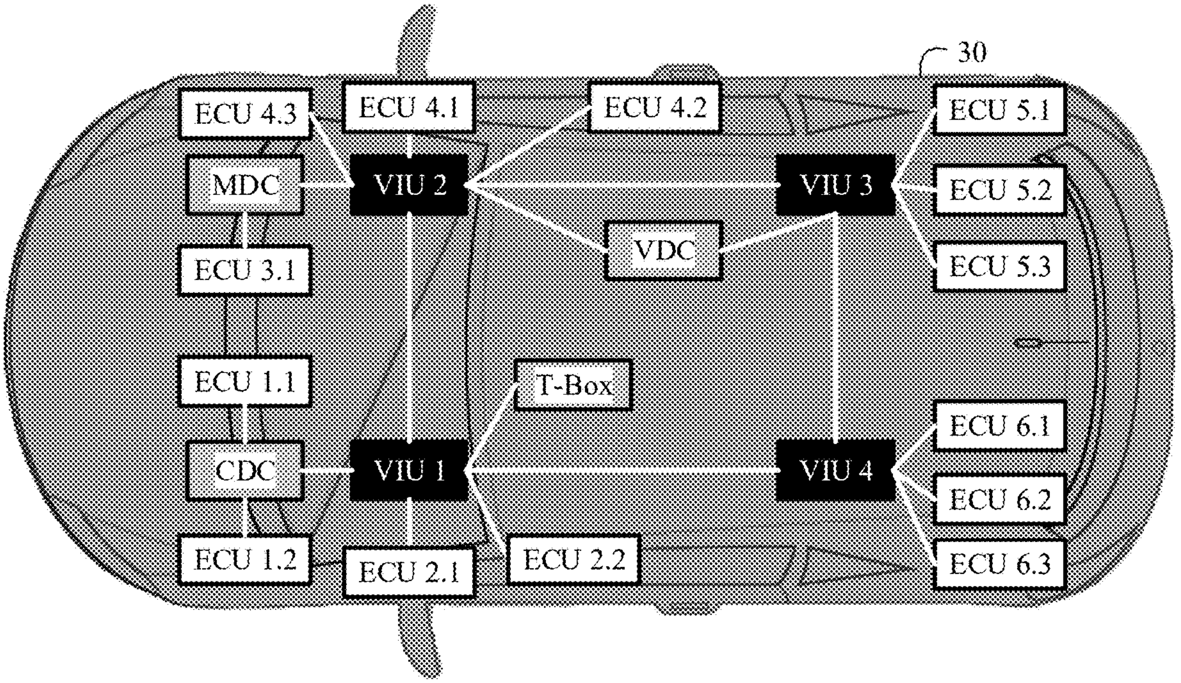
FIG. 3 is a schematic diagram of an architecture of a vehicle based on a central computing architecture according to an embodiment of this application.

In addition, because the vehicle 202 in FIG. 2 is a vehicle based on the electrical/electronic architecture, and the GW is a core component in the electrical/electronic architecture of the entire vehicle, the upgrade master module may be deployed in the GW, so that routing complexity can be reduced. However, in another vehicle architecture, as a quantity of components increases, a structure is complex. If the upgrade master module upgrades an ECU with a long distance (the long distance may be understood as a large quantity of hops that need to be passed from the upgrade master module to the to-be-upgraded ECU), vehicle upgrade efficiency is affected. FIG. 3 is a schematic diagram of an architecture of a vehicle based on a central computing architecture according to an embodiment of this application. The vehicle 30 is a vehicle based on a central computing architecture (CCA). The CCA includes several vehicle integration units (VIU) and a plurality of vehicle components. A plurality of VIUs form a ring network, to implement high bandwidth (high-definition camera and high-definition display), low latency, and high reliability processing capabilities, to continuously improve competitiveness, simplify an in-vehicle network configuration, and improve upgrade and maintenance efficiency. The vehicle component (such as an ECU or a T-Box) may be connected to the VIU, or may be connected to a domain controller (DC) such as a cockpit domain controller (CDC), an MDC, or a vehicle domain controller (VDC), and then connected to the VIU through the DC. This avoids a case in which a component of each vehicle in a conventional system for implementing an electronic control function in the vehicle needs to be connected to a domain controller DC by using a respective harness, and helps reduce a length of the harness in the system for implementing the electronic control function in the vehicle.

As shown in FIG. 3, compared with the vehicle electrical/electronic architecture (E/E) used by the vehicle 202 in FIG. 2, in a plurality of components of the vehicle 30, some components (for example, an ECU 2.1, an ECU 2.2, and a T-Box) are connected to a VIU 1, some components (for example, an ECU 4.1 and an ECU 4.2) are connected to a VIU 2, some components are connected to a VIU 3, and some components are connected to a VIU 4. In this case, if an upgrade master module is deployed in the T-Box, for an ECU 5.1 that needs to be upgraded, a path of a distributed upgrade package passes through buses of the VIU 1, the VIU 2, and the VIU 3, and then passes through the VIU 3 to the ECU 5.1. It can be learned that because an upgrade route is complex (which may be understood as a large quantity of hops to be passed), in the manner in which an upgrade package is distributed by using an upgrade master node, vehicle upgrade complexity increases, and efficiency is affected.

It should be noted that, in the architecture shown in FIG. 3, a connection line in each node may be an Ethernet-based bus, or may be one or more of a controller area network (CAN) bus, a local interconnect network (LIN) bus, a media oriented system transport (MOST) bus, FlexRay, and the like.

Figure 4:
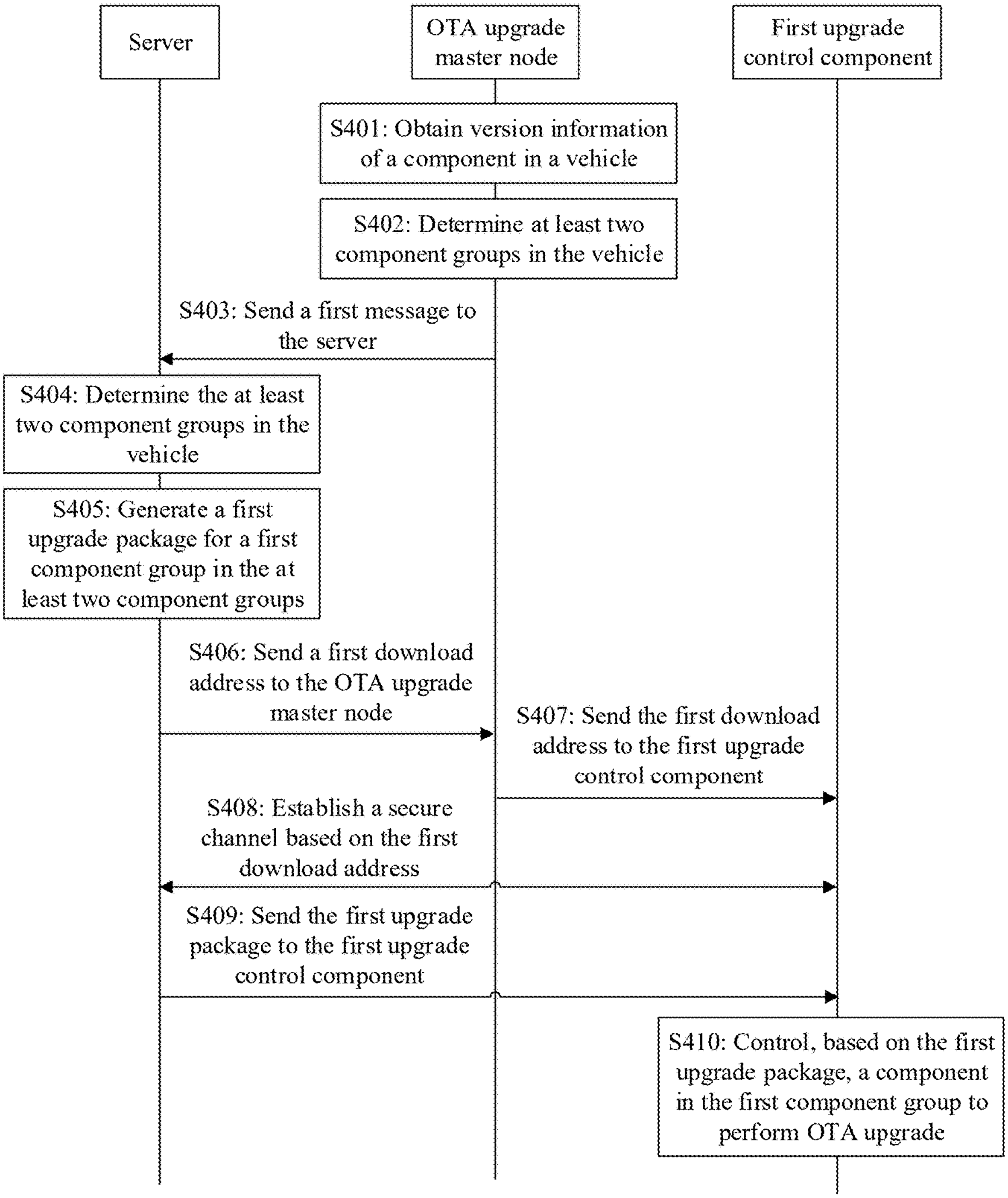
FIG. 4 is a schematic flowchart of a vehicle upgrade method according to an embodiment of this application.

FIG. 4 is a schematic flowchart of a vehicle upgrade method according to an embodiment of this application. The method includes but is not limited to the following operations.

Step S401: An OTA upgrade master node obtains version information of a component in a vehicle.

Specifically, the component in the vehicle may be an electronic device having a data processing capability or data receiving and sending capabilities, for example, may be various GWs, T-Boxes, VIUs, DCs, or ECUs in the vehicle, or may be a media device in the vehicle, for example, a camera or a radar. The ECU includes one or more of a processor, a memory, an input/output (I/O) interface, an analog-to-digital converter (A/D), and a large-scale integrated circuit such as a shaper or a drive, and may implement various functions.

The OTA upgrade master node is an electronic device that supports an OTA technology. The OTA upgrade master node may communicate with a server and each upgrade control component in the vehicle, to assist in completing upgrade of each component in the vehicle. In an embodiment, the OTA upgrade master node may be an independent component in the vehicle, or may be deployed as a module in one of components. Further, the OTA upgrade master node may be a hardware module, or may be a computer program. For example, a T-Box of a vehicle may include an OTA module, and the OTA module supports an OTA technology. Therefore, the T-Box may be considered as an OTA upgrade master node. For another example, a component supporting an OTA technology is pre-assembled in a vehicle, and a processor, an integrated circuit, or the like is integrated into the component. The component supporting the OTA technology may be considered as an OTA upgrade master node.

The version information of the component may include one or more of software version information of the component, calibration data version information, hardware version information (for example, a specification of hardware, a model, or an identifier of hardware, where software that needs to be upgraded based on version information of different hardware may be different), an identifier (ID) of the component, a version number of the component, and the like. For example, a camera of the vehicle includes a camera program, and a program version number "v12.5.8" of the camera program may be version information of the camera. For another example, specifications and models of a main control chip and a photosensitive chip in the camera may also be version information of the camera.

There may be the following designs in which the OTA upgrade master node obtains version information of a plurality of components in the vehicle.

Design 1: The OTA upgrade master node receives version information that is of a component in a first component group and that is sent by a first upgrade control component. Specifically, the vehicle may include at least two component groups, and each component group includes one upgrade control component. The upgrade control component is configured to control a component in the component group to complete upgrade, and may be an independent component in the vehicle, or may be deployed as a module in one of the components (for example, may be deployed in a DC and/or a VIU). An upgrade control component in the first component group is the first upgrade control component. The first upgrade control component may collect the version information of the component in the first component group, and then send the version information of the component to the OTA upgrade master node. Correspondingly, the OTA receives the version information that is of the component in the first component group and that is sent by the first upgrade control component.

Design 2: The OTA upgrade master node receives version information that is of a component in the vehicle and that is sent by a report node.

The report node may be a domain controller, a gateway, a distributed gateway, a vehicle integration unit, or the like in the vehicle. The report node may report, to the OTA upgrade master node, the version information of the component collected by the report node. For example, a CDC may collect version information of a plurality of components (for example, one or more of a microphone, a radar, a speaker, and a keyless start module) in a cockpit domain, and then may send the version information to the OTA upgrade master node. Subsequently, the OTA upgrade master node may send the version information to the server, to determine a component that needs to be updated.

Design 3: The OTA upgrade master node may receive version information of at least one component that is sent by the at least one component.

Specifically, a component in the vehicle may periodically or aperiodically send version information of the component (or send version information of another component stored in the component, or forward version information of another component) to the OTA upgrade master node. Correspondingly, the OTA upgrade master node receives the version information of the at least one component that is sent by the at least one component. In an embodiment, a component in the vehicle may send version information of the component to the OTA upgrade master node each time a version is upgraded.

Alternatively, version information of a component in the vehicle may be preconfigured in the OTA upgrade master node, or the OTA upgrade master node may query version information of a component in the vehicle by using a management interface.

In an embodiment, the vehicle upgrade method further includes operation S402. Details are as follows:

Step S402: The OTA upgrade master node determines at least two component groups in the vehicle. In an embodiment, herein, it may be understood that in an actual processing process, the OTA upgrade master node may determine the at least two component groups in the vehicle, or may not determine the at least two component groups in the vehicle. For example, a component group in the vehicle may be preconfigured or predefined. In this case, the OTA upgrade master node does not need to re-determine the at least two component groups in the vehicle. This may depend on implementation of the OTA upgrade master node, a pre-agreement, or a definition in a standard.

Specifically, a component group of the vehicle includes at least one component in the vehicle. Each component group includes one upgrade control component configured to control a component in the component group to perform OTA upgrade, and may further include another component in the vehicle, for example, a T-Box or an ECU. When a component group includes only one component, the component is not only an upgrade control component in the component group, but also a to-be-upgraded component in the component group.

In an embodiment, the at least two component groups may be determined by the OTA upgrade master node based on at least one of a preconfigured policy, a node connection relationship in the vehicle, and a configuration or load of each node. In an embodiment, the group policy may be implemented by using a predefined or preconfigured group method, or may be implemented by using an algorithm, a model, or the like.

Figure 5:
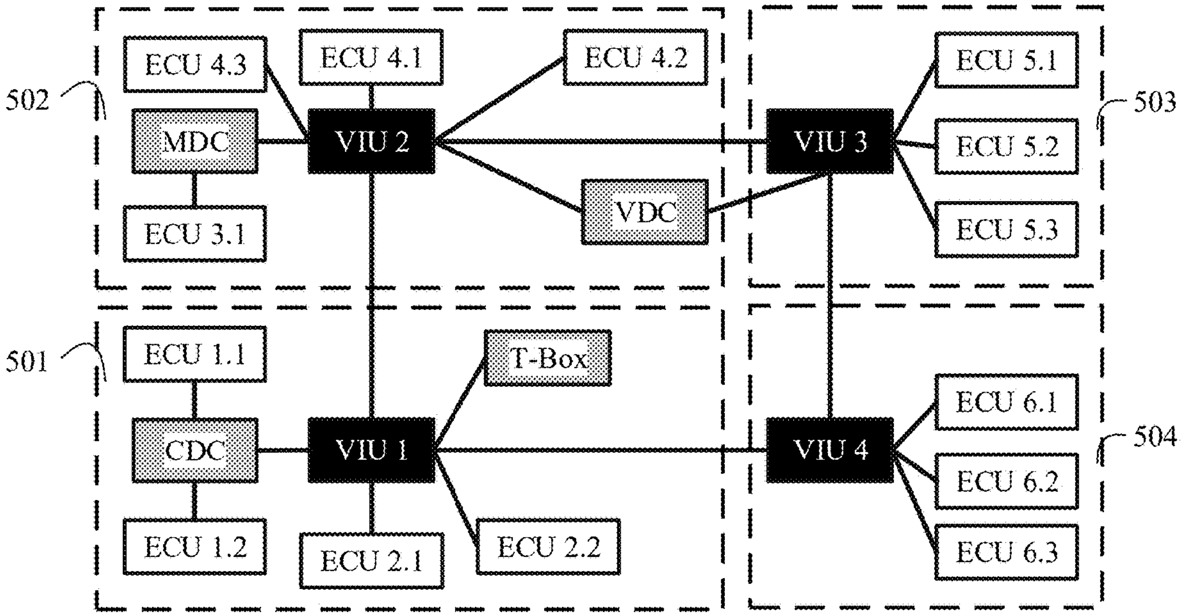
FIG. 5 is a schematic diagram of a structure of a possible component group according to an embodiment of this application.

For example, the OTA upgrade master node may group a plurality of components with functions in one area into one component group, and then determine, based on a load status of a component (for example, a domain controller DC and a vehicle integration unit VIU) in the component group, whether to set a component as an upgrade control component. FIG. 5 is a schematic diagram of a structure of a possible component group according to an embodiment of this application. The OTA upgrade master node uses one VIU and a component connected to the VIU as one component group, and uses the VIU as an upgrade control apparatus in the component group. As shown in an area 501, a first component group includes a VIU 1, a CDC, an ECU 1.1, an ECU 1.2, an ECU 2.1, an ECU 2.2, and a T-Box shown in the figure, and an upgrade control component is the VIU 1. As shown in an area 502, a second component group includes a VIU 2, an MDC, an ECU 3.1, an ECU 4.1, an ECU 4.2, an ECU 4.3, and a VDC shown in the figure, and an upgrade control component is the VIU 2. As shown in an area 503, a third component group includes a VIU 3, an ECU 5.1, an ECU 5.2, and an ECU 5.3, and an upgrade control component is the VIU 3. As shown in an area 504, a fourth component group includes a VIU 4, an ECU 6.1, an ECU 6.2, and an ECU 6.3, and an upgrade control component is the VIU 4. Group information shown in Table 1 may be obtained based on the components and the upgrade control components included in the component groups.

TABLE 1

| Group information | | |
|---|---|---|
| Group number | Included component | Upgrade control component |
| 1 | VIU 1, CDC, ECU 1.1, ECU 1.2, ECU 2.1, ECU 2.2, and T-Box | VIU 1 |
| 2 | VIU 2, MDC, ECU 3.1, ECU 4.1, ECU 4.2, ECU 4.3, and VDC | VIU 2 |
| 3 | VIU 3, ECU 5.1, ECU 5.2, and ECU 5.3 | VIU 3 |
| 4 | VIU 4, ECU 6.1, ECU 6.2, and ECU 6.3 | VIU 3 |

Figure 6:
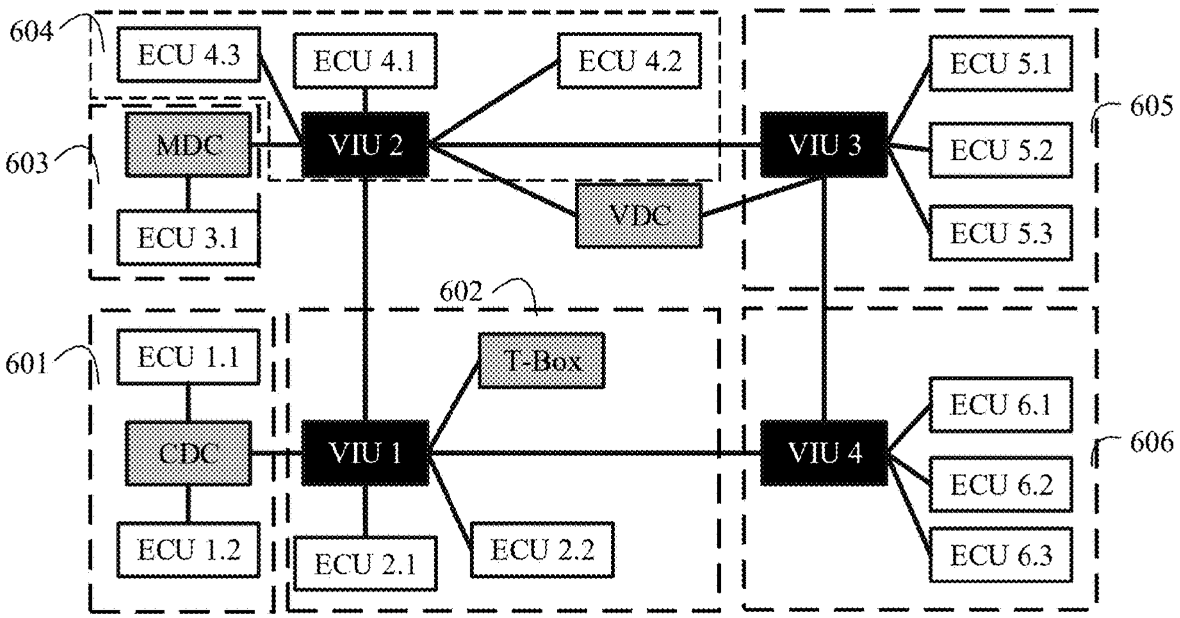
FIG. 6 is a schematic diagram of a structure of another possible component group according to an embodiment of this application.

FIG. 6 is a schematic diagram of a structure of another possible component group according to an embodiment of this application. The OTA upgrade master node uses a component connected to a VIU or a DC as one component group, and uses the VIU or the DC as an upgrade control apparatus in the component group. As shown in an area 601, a first component group includes a CDC, an ECU 1.1, and an ECU 1.2 shown in the figure, and an upgrade control component is the CDC. As shown in an area 602, a second component group includes a VIU 1, an ECU 2.1, an ECU 2.2, and a T-Box, and an upgrade control component is the VIU 1. As shown in an area 603, a third component group includes an MDC and an ECU 3.1 shown in the figure, and an upgrade control component is a VIU 2. As shown in an area 604, a fourth component group includes the VIU 2, an ECU 4.1, an ECU 4.2, and an ECU 4.3. As shown in an area 605, a fifth component group includes a VIU 3, an ECU 5.1, an ECU 5.2, and an ECU 5.3, and an upgrade control component is the VIU 3. As shown in an area 606, a sixth component group includes a VIU 4, an ECU 6.1, an ECU 6.2, and an ECU 6.3, and an upgrade control component is the VIU 4. A seventh component group includes a VDC, and an upgrade control component is the VDC. Group information shown in Table 2 may be obtained based on the components and the upgrade control components included in the component groups.

TABLE 2

| Group information | | |
|---|---|---|
| Group number | Included component | Upgrade control component |
| 1 | CDC, ECU 1.1, and ECU 1.2 | CDC |
| 2 | VIU 1, ECU 2.1, ECU 2.2, and T-Box | VIU 1 |
| 3 | MDC and ECU 3.1 | MDC |
| 4 | VIU 2, ECU 4.1, ECU 4.2, and ECU 4.3 | VIU 2 |
| 5 | VIU 3, ECU 5.1, ECU 5.2, and ECU 5.3 | VIU 3 |
| 6 | VIU 4, ECU 6.1, ECU 6.2, and ECU 6.3 | VIU 4 |
| 7 | VDC | VDC |

It should be noted that structures of the foregoing components and numbers of the shown ECUs are merely used as examples, and another ECU and another component may be further included in an embodiment. A format of storing the group information may be a set (for example, an information subset or a correspondence set), a mapping table (for example, a table in a relational database), a data table, or the like. For ease of description herein, the group information is described in a form of a data table, but this is not intended to limit that the group information in this application is definitely in a form of a table.

In an embodiment, an upgrade control component in a component group may be a component that meets a specific configuration condition. For example, the upgrade control component is a component whose load is less than or equal to a first threshold. For another example, the upgrade control component is a component on which a security certificate is deployed. Further, optionally, the OTA upgrade master node may determine an upgrade control component based on a configuration of each component, and use a component close to the upgrade control component as a component group.

In a possible solution, the OTA upgrade master node determines, based on a load status of a control component (for example, a domain controller DC and a vehicle integration unit VIU) with a centralized computing capability in the component group, whether to set a control component as an upgrade control component. Because an upgrade control component needs to establish a connection to the server, if load of a current node is relatively high, the current node is not suitable to be determined as the upgrade control component. Therefore, a load threshold is determined to be the first threshold. The first threshold is a predefined value, a preconfigured value, or a value pre-specified in a protocol. Because the upgrade control component needs to complete an upgrade task subsequently, a component whose load is less than or equal to the first threshold is determined as the upgrade control component. This can reduce pressure on the component, so that a subsequent upgrade and download task can be completed as soon as possible, thereby ensuring upgrade efficiency of the vehicle. In another possible solution, an upgrade control component needs to establish a secure channel with the server based on a security certificate. In this case, only a component on which the security certificate is deployed is qualified to be determined as the upgrade control component.

Step S403: The OTA upgrade master node sends a first message to the server.

Specifically, the first message is used to indicate version information of components in the at least two component groups in the vehicle. It may be understood that the OTA upgrade master node sends the first message to the server. Correspondingly, the server may receive the first message from the OTA upgrade master node, so as to obtain the version information of the at least two component groups in the vehicle.

In an embodiment, the first message further includes an identifier of the vehicle. The identifier of the vehicle may be one or more of a vehicle identification number (VIN, which is also referred to as a vehicle identification number) of the vehicle, a model of the vehicle (which may include one or more of a manufacturer, a model, a production batch number, and the like, where for example, benz-S350L-2020 represents Benz S350L 2020), an integrated circuit card identity (ICCID) of the vehicle, a product serial number (SN) of the vehicle, and the like.

In an embodiment, the first message further includes group information of the vehicle, and the group information is used to indicate the at least two component groups. For example, the group information may be Table 1 or Table 2.

In an embodiment, a data link for receiving and sending information between the OTA upgrade master node and the server may include various types of connection media, and may be a wired link (such as an optical fiber), a wireless link, a combination of a wired link and a wireless link, or the like. For example, the data link may use 802.11b/g, Bluetooth, Zigbee, an in-vehicle short-distance wireless communications technology, a global system for mobile communications (GSM), a general packet radio service (GPRS), a universal mobile telecommunications system (UMTS), an ultra-wideband (UWB) technology, or an in-vehicle wireless transmission technology. Certainly, there may be another technology that can be used to support communication between the upgrade master node and the server.

Step S404: The server determines the at least two component groups in the vehicle.

Specifically, the server mentioned in embodiments of this application may be one server, or may be a server cluster including a plurality of servers. For example, a distributed server may be a server cluster including a plurality of servers. The cluster may include a cloud computing server, a content delivery network (CDN) server, a network time protocol (NTP) server, a domain name system (DNS) server, and the like. The servers may coordinate with each other to jointly complete functions such as computing, data storage, and communication. For ease of description, a single server, a distributed server, and a server cluster are collectively referred to as a server in embodiments of this application.

Each of the at least two component groups in the vehicle includes one upgrade control component configured to control a component in the component group to perform OTA upgrade. There are at least the following two implementations in which the server determines the at least two component groups in the vehicle.

Implementation 1: The server receives, from the OTA upgrade master node, the group information for indicating the at least two component groups. For example, the OTA upgrade master node may send, to the server, the group information for indicating the at least two component groups. Correspondingly, the server receives the group information, and then determines the at least two component groups. For another example, the OTA upgrade master node uses the first message to carry the group information for indicating the at least two component groups. The server receives the first message, and parses the first message to determine the at least two component groups in the vehicle.

Implementation 2: The server queries component group information based on the identifier of the vehicle, and determines the at least two component groups in the vehicle based on a query result. Because a component group in a vehicle of a vehicle model may be preconfigured or predefined, the server may query component group information based on an identifier of the vehicle (for example, a vehicle identification number of the vehicle or a model of the vehicle), to determine the component group in the vehicle. Further, optionally, the component group information may be preconfigured in the server, or may be preconfigured in a network side device. For example, the group information may be stored in a database (which may be a distributed database) or may be stored in a network attached storage (NAS) device. The server sends a request to the database or the NAS device to query group information of a vehicle. The database or the NAS device returns a query result to the server, and the server may determine the group information of the vehicle based on the query result.

Step S405: The server generates a first upgrade package for the first component group in the at least two component groups.

Specifically, the first component group includes a component that needs to be upgraded. Therefore, the server generates the first upgrade package for the first component group. The first upgrade package is obtained by packing updated data (compression processing and the like may be further performed during specific implementation). An upgrade control component in the first component group is the first upgrade control component.

Further, the server may determine, based on the version information of the components in the at least two component groups in the vehicle, a component that needs to be upgraded. A component whose version needs to be upgraded exists in the first component group. Therefore, upgrade data used by the component that needs to be upgraded in the first component group is packed to obtain the first upgrade package.

It should be noted that, if a plurality of component groups in the vehicle need to be upgraded, the server may generate a plurality of upgrade packages for the plurality of component groups. For ease of description, the first component group is used as an example herein, but this is not intended to limit that only one component group needs to be upgraded.

In an embodiment, the vehicle upgrade method further includes operation S406. Details are as follows:

Step S406: The server sends a first download address to the OTA upgrade master node.

Specifically, the first download address is used to download the first upgrade package. For example, the first download address may be a uniform resource locator (URL). After generating the first upgrade package, the server may allocate the first download address to the first upgrade package. The first upgrade package may be downloaded, by using the download address, from a device (for example, a CDN server in a plurality of servers, a NAS device, or a distributed database) that stores the first upgrade package. The server sends the first download address to the OTA upgrade master node. Correspondingly, the OTA receives the first download address from the server.

In an embodiment, the first download address may be included in a download policy package. The server sends the download policy package to the OTA upgrade master node, and the OTA upgrade master node receives the download policy package, to obtain the first download address. Further, optionally, the download policy package includes one or more of a download policy, an upgrade condition, an upgrade policy, an upgrade sequence, or a valid time of the first download address. The download policy defines a rule for downloading the first upgrade package (for example, specifies one or more of a specific time for downloading, a specific condition to be met by a power supply status for downloading, and whether a user needs to be notified to confirm downloading). The upgrade condition indicates a condition for performing upgrade by using the first upgrade package (for example, one or more of a battery level condition and a load condition). The upgrade policy defines a rule of performing upgrade based on the first upgrade package (for example, one or more of parallel upgrade of a plurality of components, serial upgrade, whether rollback is started, and whether a user needs to be notified). The upgrade sequence is used to indicate an upgrade sequence of upgrading different components (for example, an ECU 1 is first upgraded, and then an ECU 2 is upgraded), or an upgrade sequence of a plurality of upgrade programs of a same component (for example, a system application in an ECU is first upgraded, and then an application installed by a user is upgraded). Further, optionally, the download policy package may include an OTA certificate of the server, to improve data security.

In an embodiment, the first download address may be signed by the server. In this case, the OTA upgrade master node may verify a server signature, to avoid receiving a download address sent by an untrusted node, thereby improving security of an upgrade process. Further, when the first download address is included in the download policy package, the server may sign the download policy package. In this case, the OTA upgrade master node verifies a signature of the download policy package, and performs a subsequent operation such as download address distribution only when the signature verification succeeds.

It should be noted that, if a plurality of component groups in the vehicle need to be upgraded, the server may generate a plurality of upgrade packages for the plurality of component groups. Correspondingly, there are a plurality of allocated download addresses. For ease of description, the first download address is used as an example herein, but this is not intended to limit that there is only one download address.

In an embodiment, the vehicle upgrade method further includes operation S407. Details are as follows:

Step S407: The OTA upgrade master node sends the first download address to the first upgrade control component.

Specifically, the first download address is used to download the first upgrade package, the first upgrade package is used to upgrade the component in the first component group, and the upgrade control component in the first component group is the first upgrade control component. Therefore, the OTA upgrade master node sends the first download address to the first upgrade control component. It may be understood that the OTA upgrade master node sends the first download address to the first upgrade control component. Correspondingly, the first upgrade control component receives the first download address from the OTA upgrade master node.

Because a data size of the download address is usually small, the download address is first sent to the upgrade master node and then distributed to a corresponding upgrade control component in each group. Compared with that in a case in which the server directly establishes a connection to the upgrade control component in the group to send the download address, network resource overheads can be reduced, complexity can be reduced, and upgrade efficiency can be improved.

It should be noted that a link for communication between the OTA upgrade master node and the first upgrade control component may be various types of media, and may be a wired link, a wireless link, a combination of a wired link and a wireless link, or the like. The wired link is, for example, an Ethernet-based bus, or may be one or more of a CAN bus, a LIN bus, a MOST bus, FlexRay, and the like. For example, the wireless link is a short-distance connection technology, including 802.11b/g, Bluetooth, Zigbee, or an in-vehicle short-distance wireless communications technology. For another example, the wireless link may be a long-distance connection technology, including GSM, GPRS, UMTS, an LTE (Long Term Evolution)-based communications technology, a 5th generation mobile communications technology (5G or 5G technology), or an in-vehicle wireless communications technology. Certainly, there may be another technology that can be used to support communication between the OTA upgrade master node and the first upgrade control component.

In an embodiment, the vehicle upgrade method further includes operation S408. Details are as follows:

Step S408: The first upgrade control component establishes a first secure channel with the server based on the first download address. In an embodiment, herein, it may be understood that, in an actual processing process, the first upgrade control component may establish the first secure channel with the server based on the download address, or may not establish the first secure channel. For example, the server may directly send data to the first upgrade control component through a communication link, and does not need to establish a secure channel by using a download address to transmit the data. This may depend on implementation of the first upgrade control component, a pre-agreement, or a definition in a standard.

Specifically, the first secure channel is a secure sockets layer (SSL)-based transmission channel or a transport layer security (TLS)-based transmission channel, and is used for data transmission. The secure channel includes one or more of a hypertext transfer protocol secure HTTPS secure channel, a transport layer security TLS secure channel, a datagram transport layer security DTLS secure channel, or the like.

For example, a cloud computing server may allocate a URL for downloading the first upgrade package, and the first upgrade control component may establish an HTTPS secure channel with a CDN server based on the URL, to download the first upgrade package.

Step S409: The server sends the first upgrade package to the first upgrade control component.

Specifically, the server may communicate with the first upgrade control component by using various types of connection media (for example, a wireless communication link, a wired communication link, or a combination of a wired link and a wireless link), to send the first upgrade package to the first upgrade control component. Correspondingly, the first upgrade control component receives the first upgrade package from the server.

Further, when the first upgrade control component establishes the first secure channel with the server by using the first download address, the server may send the first upgrade package to the first upgrade control component through the first secure channel. Further, the first download address may be sent by the OTA upgrade master node to the first upgrade control component (for details, refer to detailed descriptions in operation S406 and operation 407), or may be sent by the server to the first upgrade control component.

Step S410: The first upgrade control component controls, based on the first upgrade package, the component in the first component group to perform OTA upgrade.

Specifically, that the first upgrade control component sends, based on the first upgrade package, upgrade data used by each component in the upgrade package to the component in the group, instructs the component to perform upgrade, and the like may be considered as that the first upgrade control component controls the component in the first component group to perform upgrade.

Further, the first upgrade control component may receive the download policy package (which may be sent by the server to the OTA upgrade master node, and then sent by the OTA upgrade master node to the first upgrade control component) from the server. The download policy package includes the upgrade condition and the upgrade policy. The first upgrade control component may control, according to the upgrade condition and the upgrade policy, the component in the first component group to perform upgrade according to the upgrade policy when the upgrade condition is met.

In an embodiment, the first upgrade package may be signed by the server, and the first upgrade control component may verify a signature of the server. In response to that the verification on the signature succeeds, the first upgrade control component controls, based on the first upgrade package, the component in the first component group to perform OTA upgrade.

In the embodiment shown in FIG. 4, the server generates an upgrade package of a component group for the component group in the vehicle, and then distributes the upgrade package to an upgrade control component in the component group, so that the upgrade control component upgrades a component in the component group. In this way, each upgrade control component may download an upgrade package for a component group to which the upgrade control component belongs, and upgrade packages for component groups may further be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group to perform upgrade, and can monitor, detect, and command upgrade in a timely manner. Therefore, upgrade of the component can be completed as soon as possible, and vehicle stability can be improved.

This solution may be further used to improve an autonomous driving or advanced driver assistance system (ADAS) capability, and may be applied to the Internet of vehicles, for example, vehicle-to-everything (V2X), long term evolution-vehicle (LTE-V), and vehicle-to-vehicle (V2V).

The foregoing method embodiment shown in FIG. 4 includes many possible implementations. The following separately describes some of the implementations by using examples with reference to FIG. 7, FIG. 8, FIG. 9, and FIG. 10. It should be noted that, for related concepts or operations or logical relationships that are not explained in FIG. 7, FIG. 8, FIG. 9, and FIG. 10, refer to corresponding descriptions in the embodiment shown in FIG. 4. Therefore, details are not described again.

Figure 7:
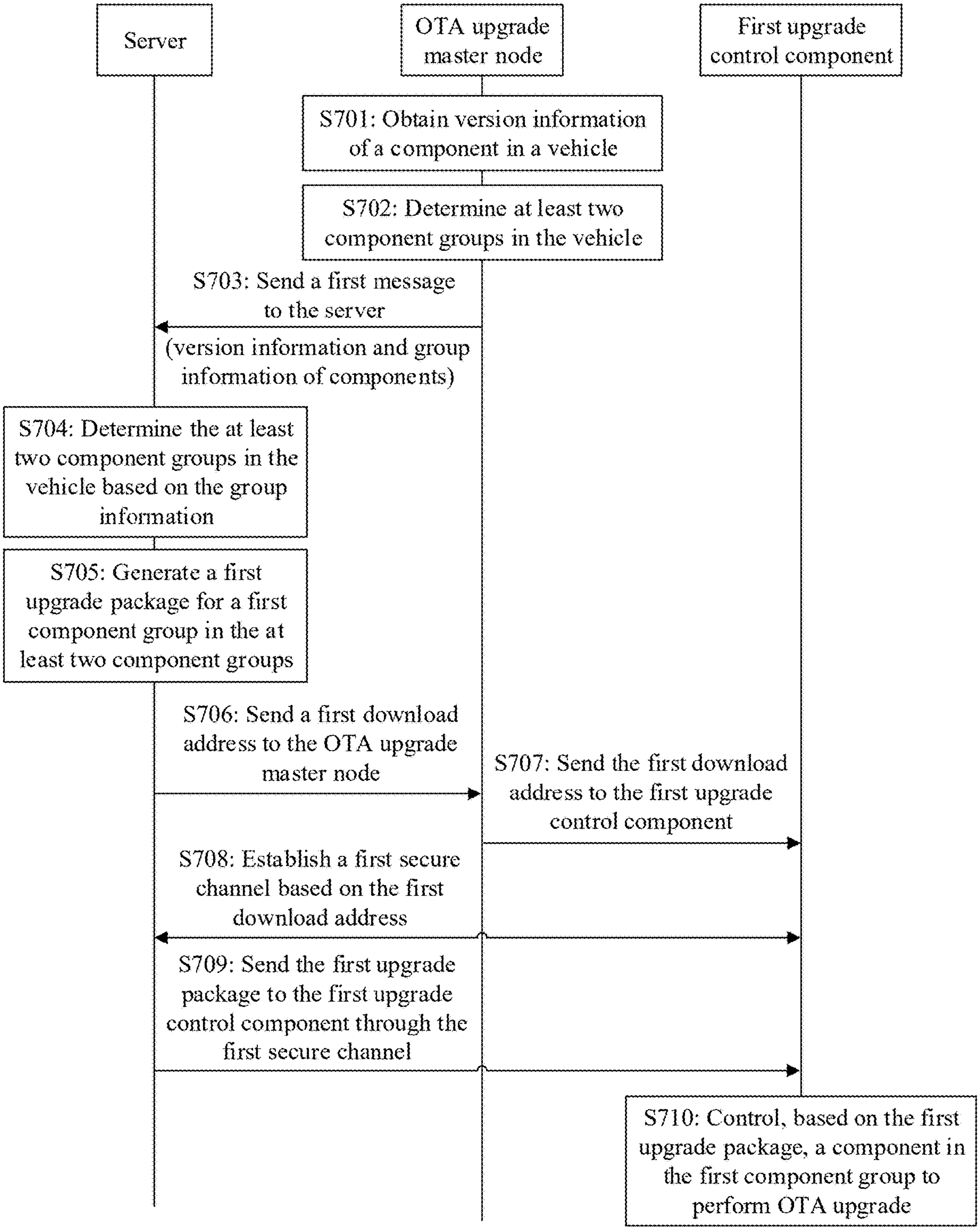
FIG. 7 is a schematic flowchart of another vehicle upgrade method according to an embodiment of this application.

FIG. 7 is a schematic flowchart of a vehicle upgrade method according to an embodiment of this application. The method includes but is not limited to the following operations.

Step S701: An OTA upgrade master node obtains version information of a component in a vehicle.

Specifically, there may be the following solutions in which the OTA upgrade master node obtains version information of a plurality of components in the vehicle.

Solution 1: The OTA upgrade master node receives version information that is of a component in the vehicle and that is sent by a report node. The report node may report, to the OTA upgrade master node, the version information of the component collected by the report node. For example, a CDC may collect version information of a plurality of components (for example, one or more of a microphone, a radar, a speaker, and a keyless start module) in a cockpit domain, and then may send the version information to the OTA upgrade master node. Subsequently, the OTA upgrade master node may send the version information to the server, to determine a component that needs to be updated.

Solution 2: The OTA upgrade master node may receive version information of at least one component that is sent by the at least one component. Specifically, a component in the vehicle may periodically or aperiodically send version information of the component (or send version information of another component stored in the component, or forward version information of another component) to the OTA upgrade master node. Correspondingly, the OTA upgrade master node receives the version information of the at least one component that is sent by the at least one component. In an embodiment, a component in the vehicle may send version information of the component to the OTA upgrade master node each time a version is upgraded.

Alternatively, version information of a component in the vehicle in which the OTA upgrade master node is located may be preconfigured in the OTA upgrade master node, or the OTA upgrade master node may query version information of a component in the vehicle by using a management interface.

Step S702: The OTA upgrade master node determines at least two component groups in the vehicle.

For details, refer to the related descriptions in operation S402.

Step S703: The OTA upgrade master node sends a first message to a server.

Specifically, the first message is used to indicate version information of components in the at least two component groups in the vehicle, the first message further includes group information in the vehicle, and the group information is used to indicate the at least two component groups. For example, the group information may be Table 1 or Table 2.

It may be understood that the OTA upgrade master node sends the first message to the server. Correspondingly, the server may receive the first message from the OTA upgrade master node, so as to obtain the version information and the group information of the components in the at least two component groups in the vehicle.

Step S704: The server determines the at least two component groups in the vehicle based on the group information.

Specifically, the server receives, from the OTA upgrade master node, the group information for indicating the at least two component groups, to determine the at least two component groups. Further, the OTA upgrade master node uses the first message to carry the group information for indicating the at least two component groups. The server receives the first message, and parses the first message to determine the at least two component groups in the vehicle.

Step S705: The server generates a first upgrade package for a first component group in the at least two component groups.

For details, refer to the detailed descriptions in operation S405.

Step S706: The server sends a first download address to the OTA upgrade master node.

For details, refer to the detailed descriptions in operation S406.

Step S707: The OTA upgrade master node sends the first download address to a first upgrade control component.

For details, refer to the detailed descriptions in operation S407.

Step S708: The first upgrade control component establishes a first secure channel with the server based on the first download address.

For details, refer to the detailed descriptions in operation S408.

Step S709: The server sends the first upgrade package to the first upgrade control component through the first secure channel.

Specifically, when the first upgrade control component establishes the first secure channel with the server by using the first download address, the server may send the first upgrade package to the first upgrade control component through the first secure channel.

Step S710: The first upgrade control component controls, based on the first upgrade package, a component in the first component group to perform OTA upgrade.

For details, refer to the detailed descriptions in operation S410.

In the embodiment shown in FIG. 7, the OTA upgrade master node may send group information of a component in the vehicle to the server, so that the server determines the at least two component groups based on the group information. The server generates, for a component group to be upgraded in the vehicle, an upgrade package of the component group, and then distributes the upgrade package to an upgrade control component in the component group, so that the upgrade control component upgrades a component in the component group. Compared with that in a case in which one OTA upgrade master module performs upgrade control on all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

Figure 8:
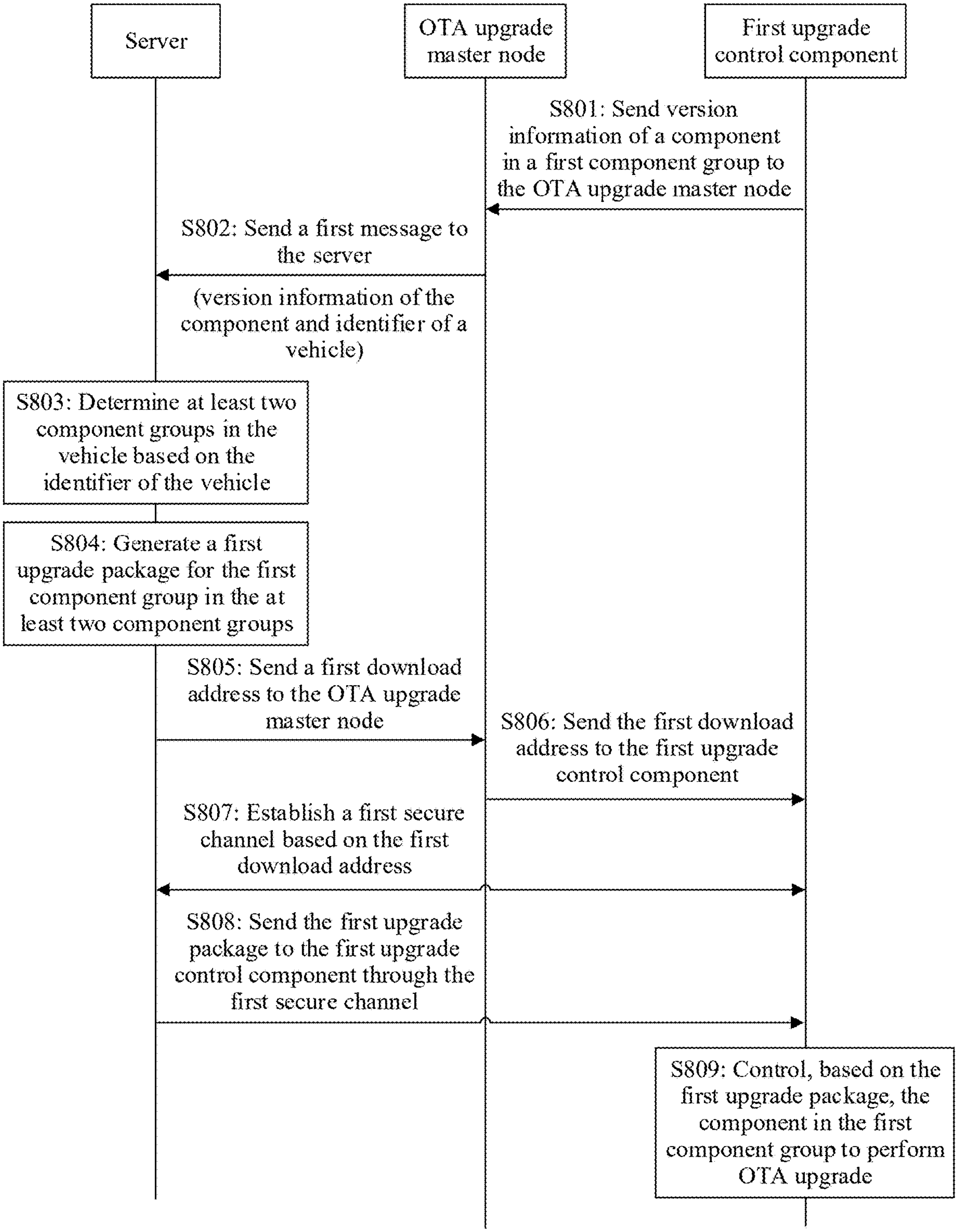
FIG. 8 is a schematic flowchart of another vehicle upgrade method according to an embodiment of this application.

FIG. 8 is a schematic flowchart of a vehicle upgrade method according to an embodiment of this application. The method includes but is not limited to the following operations.

Step S801: A first upgrade control component sends version information of a component in a first component group to an OTA upgrade master node.

Specifically, the vehicle may include at least two component groups, and each component group includes one upgrade control component. An upgrade control component in the first component group is the first upgrade control component. The first upgrade control component may collect the version information of the component in the first component group, and then send the version information of the component to the OTA upgrade master node. Correspondingly, the OTA receives the version information that is of the component in the first component group and that is sent by the first upgrade control component.

Step S802: The OTA upgrade master node sends a first message to a server.

Specifically, the first message is used to indicate version information of components in the at least two component groups in the vehicle, and further includes an identifier of the vehicle. The identifier of the vehicle may be one or more of a VIN of the vehicle, a model of the vehicle, an ICCID of the vehicle, an SN of the vehicle, and the like.

It may be understood that the OTA upgrade master node sends the first message to the server. Correspondingly, the server may receive the first message from the OTA upgrade master node, so as to obtain the version information of the at least two component groups in the vehicle and the identifier of the vehicle.

Step S803: The server determines the at least two component groups in the vehicle based on the identifier of the vehicle.

Specifically, the server queries component group information based on the identifier of the vehicle, and determines the at least two component groups in the vehicle based on a query result. Because a component group in a vehicle of a vehicle model may be preconfigured or predefined, the server may query component group information based on an identifier of the vehicle (for example, a vehicle identification number of the vehicle or a model of the vehicle), to determine the component group in the vehicle. Further, the component group information may be preconfigured in the server, or may be preconfigured in a network side device. For example, the group information may be stored in a database (which may be a distributed database) or may be stored in a network attached storage (NAS) device.

Step S804: The server generates a first upgrade package for the first component group in the at least two component groups.

For details, refer to the detailed descriptions in operation S405.

Step S805: The server sends a first download address to the OTA upgrade master node. For details, refer to the detailed descriptions in operation S406.

Step S806: The OTA upgrade master node sends the first download address to the first upgrade control component.

For details, refer to the detailed descriptions in operation S407.

Step S807: The first upgrade control component establishes a first secure channel with the server based on the first download address.

For details, refer to the detailed descriptions in operation S408.

Step S808: The server sends the first upgrade package to the first upgrade control component through the first secure channel.

Specifically, when the first upgrade control component establishes the first secure channel with the server by using the first download address, the server may send the first upgrade package to the first upgrade control component through the first secure channel.

Step S809: The first upgrade control component controls, based on the first upgrade package, the component in the first component group to perform OTA upgrade.

For details, refer to the detailed descriptions in operation S410.

Figure 9:
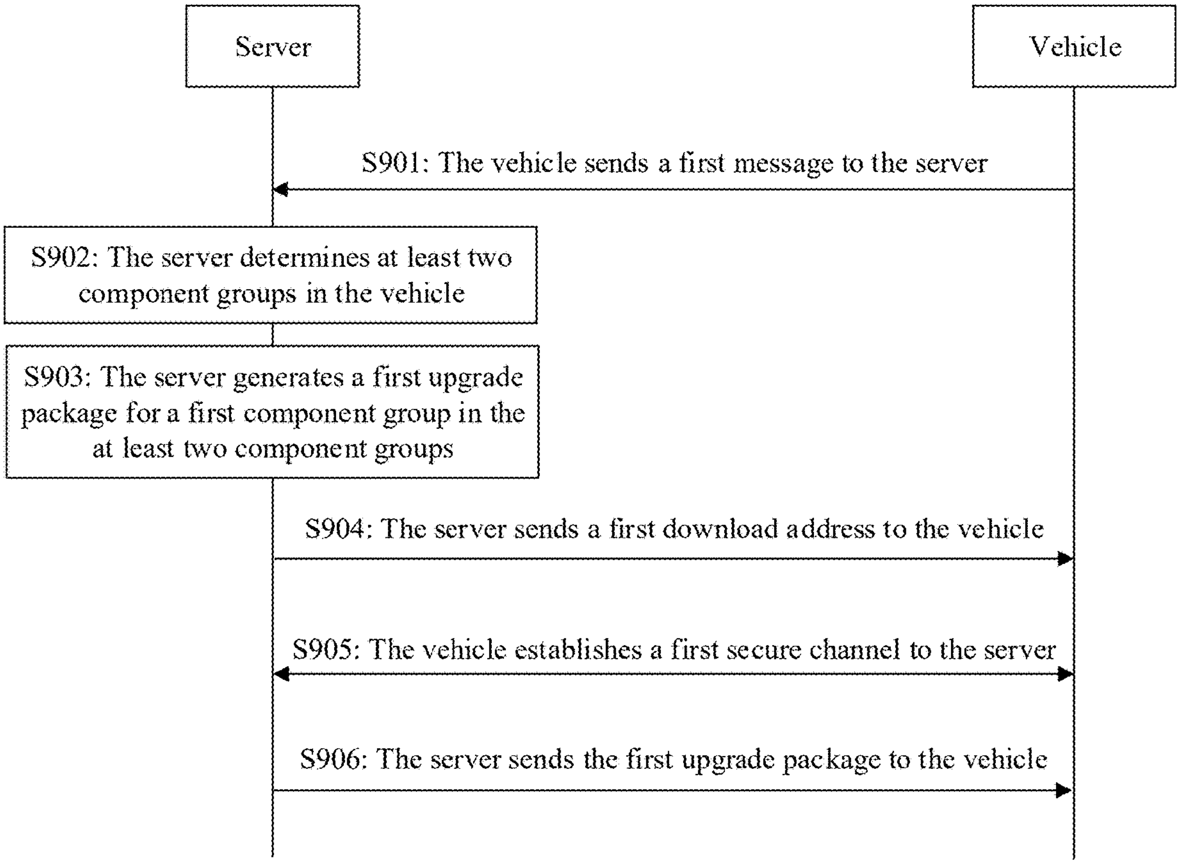
FIG. 9 is a schematic diagram of a vehicle upgrade system and a procedure of a vehicle upgrade method according to an embodiment of this application.

FIG. 9 is a schematic flowchart of a vehicle upgrade system and a vehicle upgrade method according to an embodiment of this application. The system includes a server and a vehicle. The vehicle upgrade system including the server and the vehicle is configured to perform the vehicle upgrade method. The method includes but is not limited to the following operations.

Step S901: The vehicle sends a first message to the server.

Specifically, an OTA upgrade master node in the vehicle sends the first message to the server. The OTA upgrade master node is an electronic device that has a data processing capability and data receiving and sending capabilities in the vehicle, and may be an independent component in the vehicle, or may be deployed in one of components.

The first message is used to indicate version information of components in at least two component groups in the vehicle. In an embodiment, the first message further includes an identifier of the vehicle and/or group information of the vehicle, and the group information is used to indicate the at least two component groups. For details, refer to the detailed descriptions in operation S403.

It may be understood that the OTA upgrade master node in the vehicle sends the first message to the server. Correspondingly, the server may receive the first message from the OTA upgrade master node in the vehicle, so as to obtain the version information of the at least two component groups in the vehicle.

It should be noted that, a data link for receiving and sending information between the vehicle and the server may include various types of connection media, and may be a wired link (such as an optical fiber), a wireless link, a combination of a wired link and a wireless link, or the like.

Step S902: The server determines the at least two component groups in the vehicle.

For details, refer to the detailed descriptions in operation S404.

Step S903: The server generates a first upgrade package for a first component group in the at least two component groups.

For details, refer to the detailed descriptions in operation S405.

In an embodiment, the vehicle upgrade method further includes operation S904. Details are as follows:

Step S904: The server sends a first download address to the vehicle.

Specifically, the server sends the first download address to the OTA upgrade master node in the vehicle. The first download address is used to download the first upgrade package, and the first download address may be included in a download policy package. The first upgrade package is used to upgrade a component in the first component group, and an upgrade control component in the first component group is a first upgrade control component. Therefore, the OTA upgrade master node in the vehicle may send the download address to the first upgrade control component.

For a specific process, refer to detailed descriptions in operation S406 and operation S407.

In an embodiment, the vehicle upgrade method further includes operation S905. Details are as follows:

S905: The vehicle establishes a first secure channel with the server.

Specifically, the first upgrade control component in the vehicle establishes the first secure channel with the server. The first upgrade control component establishes the first secure channel with the server based on the first download address. Specifically, the first secure channel is an SSL-based transmission channel or a TLS-based transmission channel, and is used for data transmission. The secure channel includes one or more of an HTTPS secure channel, a TLS secure channel, a DTLS secure channel, or the like.

For example, a cloud computing server may allocate a URL for downloading the first upgrade package, and the first upgrade control component may establish an HTTPS secure channel with a CDN server based on the URL, to download the first upgrade package.

S906: The server sends the first upgrade package to the vehicle.

Specifically, the server sends the first upgrade package to the first upgrade control component in the vehicle. Correspondingly, the first upgrade control component in the vehicle downloads the first upgrade package from the server.

For details, refer to the detailed descriptions in operation S407.

In the embodiment shown in FIG. 9, the server generates an upgrade package of a component group for the component group in the vehicle, and then distributes the upgrade package to an upgrade control component in the component group, so that the upgrade control component upgrades a component in the component group. In this way, each upgrade control component may download an upgrade package for a component group to which the upgrade control component belongs, and upgrade packages for component groups may further be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

Figure 10:
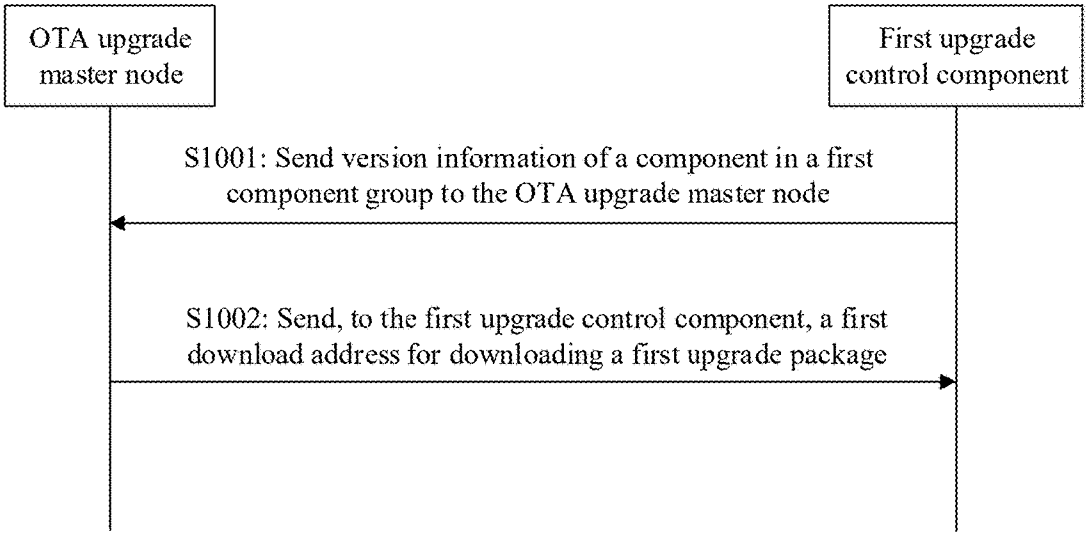
FIG. 10 is a schematic diagram of a vehicle upgrade system and a procedure of a vehicle upgrade method according to an embodiment of this application.

FIG. 10 is a schematic diagram of a vehicle upgrade system and a vehicle upgrade method according to an embodiment of this application. The vehicle upgrade system includes an OTA upgrade master node and a first upgrade control component, and is configured to perform the vehicle upgrade method. The method includes but is not limited to the following operations.

Step S1001: The first upgrade control component sends version information of a component in a first component group to the OTA upgrade master node.

Specifically, a vehicle may include at least two component groups, and each component group includes one upgrade control component. An upgrade control component in the first component group is the first upgrade control component. The first upgrade control component may collect the version information of the component in the first component group, and then send the version information of the component to the OTA upgrade master node. Correspondingly, the OTA receives the version information that is of the component in the first component group and that is sent by the first upgrade control component.

Step S1002: The OTA upgrade master node sends, to the first upgrade control component, a first download address for downloading a first upgrade package.

Specifically, the first download address is used to download the first upgrade package, the first upgrade package is used to upgrade the component in the first component group, and the upgrade control component in the first component group is the first upgrade control component. Therefore, the OTA upgrade master node sends the first download address to the first upgrade control component. It may be understood that the OTA upgrade master node sends the first download address to the first upgrade control component. Correspondingly, the first upgrade control component receives the first download address from the OTA upgrade master node. Further, the first upgrade control component may establish a secure channel with a server based on the first download address, and download the first upgrade package through the secure channel.

The first upgrade package is used to perform OTA upgrade for the component in the first component group. Further, the first upgrade control component may control the component in the first component group to perform OTA upgrade. Specifically, that the first upgrade control component sends, based on the first upgrade package, upgrade data used by each component in the upgrade package to the component in the group, instructs the component to perform upgrade, and the like may be considered as that the first upgrade control component controls the component in the first component group to perform upgrade.

In the embodiment shown in FIG. 10, the OTA upgrade master node collects version information of a plurality of components in the vehicle. The version information may be used to determine a component that needs to be upgraded, and generate an upgrade package. A download address is allocated to the upgrade package, and the OTA upgrade master node distributes the download address to an upgrade control component in a component group, so that the upgrade control component downloads the corresponding upgrade package to upgrade the component in the component group. In this way, upgrade packages for component groups may be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

The foregoing describes in detail the methods in embodiments of this application. The following provides apparatuses in embodiments of this application.

Figure 11:
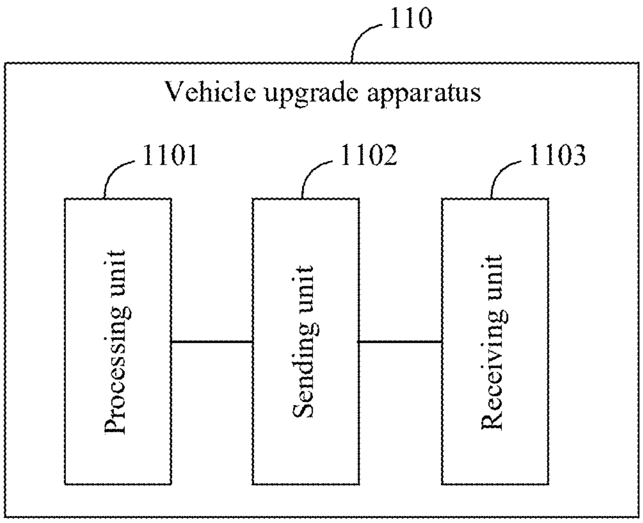
FIG. 11 is a schematic diagram of a structure of a vehicle upgrade apparatus according to an embodiment of this application.

FIG. 11 is a schematic diagram of a structure of a vehicle upgrade apparatus 110 according to an embodiment of this application. The vehicle upgrade apparatus 110 is configured to implement the foregoing vehicle upgrade method, for example, the vehicle upgrade method in any embodiment shown in FIG. 4, FIG. 7, FIG. 8, FIG. 9, or FIG. 10.

It should be understood that, in the apparatus embodiments of this application, division into a plurality of units or modules is merely logical division based on functions, and is not intended to limit a specific structure of the apparatus. In specific implementation, some function modules may be subdivided into more small function modules, or some function modules may be combined into one function module. However, regardless of whether these function modules are subdivided or combined, procedures performed by the apparatus 110 in a vehicle upgrade process are roughly the same. For example, a receiving unit 1103 and a sending unit 1102 in the apparatus 110 may alternatively be combined into a communications unit. Usually, each unit corresponds to program code (that is, program instructions) of the unit. When program code corresponding to the units is run on a processor, the units are enabled to perform corresponding procedures to implement corresponding functions.

In some possible implementations, the vehicle upgrade apparatus 110 may be the server in the embodiment shown in FIG. 4, FIG. 7, or FIG. 8, or a component in the server, for example, a chip or an integrated circuit. The apparatus includes a processing unit 1101 and a sending unit 1102. The units are described as follows:

The processing unit 1101 is configured to determine at least two component groups in a vehicle, where each component group includes one upgrade control component configured to control a component in the component group to perform OTA upgrade.

The processing unit 1101 is further configured to generate a first upgrade package for a first component group in the at least two component groups, where an upgrade control component in the first component group is a first upgrade control component.

The sending unit 1102 is configured to send the first upgrade package to the first upgrade control component, where the first upgrade package is used to upgrade a component in the first component group. Further, optionally, the vehicle upgrade apparatus may be deployed in a server.

In this embodiment of this application, the vehicle upgrade apparatus 110 generates an upgrade package of a component group for the component group in the vehicle, and then distributes the upgrade package to an upgrade control component in the component group, so that the upgrade control component upgrades a component in the component group. Compared with that in a case in which one OTA upgrade master module performs upgrade control on all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment, the processing unit 1101 is further configured to allocate a first download address for downloading the first upgrade package;

- the sending unit 1102 is further configured to send the first download address to an OTA upgrade master node in the vehicle;
- the processing unit 1101 is further configured to establish, with the first upgrade control component, a first secure channel for downloading the first upgrade package; and
- the sending unit 1101 is further configured to send the first upgrade package to the first upgrade control component through the first secure channel.

The foregoing describes a manner of downloading an upgrade data package. The vehicle upgrade apparatus 110 may allocate a download address to the first upgrade package. The download address may be first sent to the OTA upgrade master node, and then the OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the vehicle upgrade apparatus 110 directly establishes a connection to the upgrade control component in the group to send the download address, network resource overheads can be reduced, complexity can be reduced, and upgrade efficiency can be improved.

In another possible implementation, the first secure channel includes at least a hypertext transfer protocol secure HTTPS secure channel, a transport layer security TLS secure channel, or a datagram transport layer security DTLS secure channel.

In another possible implementation, the apparatus further includes a receiving unit 1103, and the receiving unit 1103 is configured to receive, from the OTA upgrade master node by using the receiving unit, group information for indicating the at least two component groups.

The foregoing embodiment describes a manner of determining a plurality of component groups. The OTA upgrade master node may send group information of a component in the vehicle to the vehicle upgrade apparatus 110, so that the vehicle upgrade apparatus 110 determines the at least two component groups based on the group information. Further, the at least two component groups may be determined by the OTA upgrade master node based on at least one of a preconfigured policy, a node connection relationship in the vehicle, a configuration of each node, load, and the like.

In another possible implementation, the processing unit 1101 is further configured to: query, based on an identifier of the vehicle, component group information preconfigured in the vehicle upgrade apparatus 110, and determine the at least two component groups in the vehicle based on a query result.

The foregoing embodiment describes another manner of determining a plurality of component groups. The vehicle upgrade apparatus 110 may query the group information based on the identifier of the vehicle. Because component group information of a vehicle of a specific model may be preconfigured or predefined, the vehicle upgrade apparatus 110 may query the component group information based on the identifier of the vehicle (for example, a vehicle identification number of the vehicle or a model of the vehicle), to determine the component groups of the vehicle.

In another possible implementation, the receiving unit 1103 is further configured to receive a first message from the OTA upgrade master node, where the first message includes version information for indicating components in the at least two component groups; and the processing unit 1101 is further configured to generate the first upgrade package for the first component group in the at least two component groups based on the version information of the components in the at least two component groups.

It can be learned that the vehicle upgrade apparatus 110 determines the first upgrade package based on the version information of the component. Further, the vehicle upgrade apparatus 110 may determine, based on version information of the component in the first component group, that a component whose version needs to be upgraded exists in the first component group, to package upgrade data to obtain the first upgrade package.

It should be noted that, for implementation of each unit, refer to corresponding descriptions in the embodiment shown in FIG. 4, FIG. 7, or FIG. 8.

In some embodiments, the vehicle upgrade apparatus 110 may be the OTA upgrade master node in the embodiment shown in FIG. 4, FIG. 7, or FIG. 8, or a component in the OTA upgrade master node, for example, a chip or an integrated circuit. The apparatus 110 may include a sending unit 1102 and a receiving unit 1103. The units are described as follows:

The sending unit 1102 is configured to send a first message to a server, where the first message is used to indicate version information of components in at least two component groups in a vehicle.

The receiving unit 1103 is configured to receive a first download address that is used to download a first upgrade package and that is sent by the server, where the first upgrade package is used to upgrade a first component group in the at least two component groups in the vehicle, and the first component group includes a first upgrade control component configured to control a component in the first component group to perform OTA upgrade.

The sending unit 1102 is further configured to send the first download address to the first upgrade control component. Further, the vehicle upgrade apparatus 110 may be deployed in the vehicle.

In this embodiment of this application, the vehicle upgrade apparatus 110 reports the version information of the component in the vehicle to the server, and the server may determine, based on the version information, a component that needs to be upgraded, and generate an upgrade package. A download address is allocated to the upgrade package, and the vehicle upgrade apparatus 110 distributes the download address to an upgrade control component in a component group, so that the upgrade control component downloads the corresponding upgrade package to upgrade the component in the component group. In this way, upgrade packages for component groups may be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another possible implementation, the first message is further used to indicate group information of the at least two component groups.

It can be learned that the vehicle upgrade apparatus 110 may send group information of a component in the vehicle to the server, so that the server determines the at least two component groups based on the group information. Further, the group information may be determined by the vehicle upgrade apparatus 110 based on at least one of a preconfigured policy, a node connection relationship in the vehicle, a configuration of each node, load, and the like.

In another possible implementation, the receiving unit 1103 is further configured to receive version information that is of at least one component in the vehicle and that is sent by a report node.

The report node may be a domain controller, a gateway, a distributed gateway, a vehicle integration unit, or the like in the vehicle. The report node may report, to the vehicle upgrade apparatus 110, the version information of the component collected by the report node. For example, a cockpit domain controller (CDC) may collect version information of a plurality of components (for example, one or more of a microphone, a radar, a speaker, and a keyless start module) in a cockpit domain, and then may send the version information to the vehicle upgrade apparatus 110. Subsequently, the vehicle upgrade apparatus 110 may send the version information to the server, to determine a component that needs to be updated.

In another possible implementation, the apparatus further includes a processing unit 1101, configured to determine the at least two component groups in the vehicle.

Further, the at least two component groups may be determined by the vehicle upgrade apparatus 110 based on at least one of a preconfigured policy, a node connection relationship in the vehicle, a configuration of each node, load, and the like. For example, the vehicle upgrade apparatus 110 may group a plurality of components with functions in one area into one component group, and then determine, based on a load status of a control component (for example, a domain controller DC and a vehicle integration unit VIU) with a centralized computing capability in the component group, whether to set a control component as an upgrade control component. For another example, an upgrade control component may be first determined based on a configuration of each component, and then components close to the upgrade control component are used as a component group. Specifically, for example, the upgrade control component needs to establish a secure channel with the server based on a security certificate. In this case, only a component in which the security certificate is deployed is qualified to be determined as the upgrade control component. For another example, an upgrade control component needs to establish a connection to the server. Therefore, if load of a current node is relatively high, the current node is not suitable to be determined as the upgrade control component.

In another possible implementation, the receiving unit 1103 is further configured to receive version information of the component in the first component group from the first upgrade control component.

It can be learned that the first upgrade control component may collect the version information of the component in the group and send the version information to the vehicle upgrade apparatus 110. Subsequently, the vehicle upgrade apparatus 110 may send the version information to the server, to determine a component that needs to be updated.

In another possible implementation, the first upgrade control component is a domain controller DC or a vehicle integration unit VIU.

In another possible implementation, load of the first upgrade control component is less than or equal to a first threshold; and/or a security certificate is deployed in the first upgrade control component.

It should be noted that, for implementation of each unit, refer to corresponding descriptions in the embodiment shown in FIG. 4, FIG. 7, or FIG. 8.

In some possible implementations, the vehicle upgrade apparatus 110 may be the first upgrade control component in the embodiment shown in FIG. 4, FIG. 7, or FIG. 8, or a module in the first upgrade control component, for example, a chip or an integrated circuit. The apparatus 110 may include a processing unit 1101 and a receiving unit 1103. The units are described as follows:

The receiving unit 1103 is configured to receive a first upgrade package sent by a server, where the first upgrade package is used to perform OTA upgrade for a component in a first component group.

The processing unit 1101 is configured to control, based on the first upgrade package, the component in the first component group to perform OTA upgrade. Further, the vehicle upgrade apparatus 110 is used in a vehicle, the vehicle upgrade apparatus 110 is configured to control the component in the first component group to perform OTA upgrade, and the first component group is one of at least two component groups in the vehicle.

In this embodiment of this application, the server generates the first upgrade package of the first component group for the component group in the vehicle, and then sends the first upgrade package to the vehicle upgrade apparatus 110, so that the vehicle upgrade apparatus 110 upgrades the component in the component group. In this way, a vehicle upgrade apparatus 110 in each group may download an upgrade package for the component group to which the vehicle upgrade apparatus belongs, and upgrade packages for component groups may further be downloaded at the same time, so that vehicle upgrade apparatuses 110 in all groups perform upgrade at the same time. Compared with that in a case in which one OTA upgrade master module upgrades all components in the vehicle, vehicle upgrade efficiency is improved. Further, each component may be upgraded by a close vehicle upgrade apparatus 110 in a group, so that vehicle upgrade complexity is reduced. In addition, the vehicle upgrade apparatus 110 in each component group controls the component in the group to perform upgrade, and can monitor, detect, and command upgrade in a timely manner. Therefore, upgrade of the component can be completed as soon as possible, and vehicle stability can be improved.

In an embodiment, the apparatus further includes a sending unit 1102, configured to send version information of the component in the first component group to an OTA upgrade master node in the vehicle.

It can be learned that the vehicle upgrade apparatus 110 may collect the version information of the component in the group and send the version information to the OTA upgrade master node. Subsequently, the OTA upgrade master node may send the version information to the server, to determine a component that needs to be updated.

In another possible implementation, the receiving unit 1103 is further configured to receive a first download address that is sent by the OTA upgrade master node and that is used to download the first upgrade package;

the processing unit 1101 is further configured to establish a first secure channel with the server based on the first download address, where the first secure channel is used to download the first upgrade package; and the receiving unit 1103 is further configured to receive, through the first secure channel, the first upgrade package sent by the server.

The foregoing describes a manner of downloading an upgrade data package. The OTA upgrade master node distributes the download address to the vehicle upgrade apparatus 110 that needs the first upgrade package to complete upgrade. Because a data size of the download address is usually small, the download address is first sent to the upgrade master node and then distributed to a corresponding vehicle upgrade apparatus 110 in each group. Compared with that in a case in which the server directly establishes a connection to a vehicle upgrade apparatus 110 in the group to send the download address, network resource overheads can be reduced, complexity can be reduced, and upgrade efficiency can be improved.

In another possible implementation, the first upgrade package is signed by the server; and the processing unit 1101 is further configured to verify a signature of the first upgrade package.

The processing unit 1101 is further configured to: in response to that the verification on the signature succeeds, control, based on the first upgrade package, the component in the first component group to perform OTA upgrade.

It can be learned that before upgrade, the upgrade control apparatus first verifies a source of the data package based on the signature, to avoid establishing a connection to an untrusted server, thereby improving security in a vehicle upgrade process.

It should be noted that, for implementation of each unit, refer to corresponding descriptions in the embodiment shown in FIG. 4, FIG. 7, or FIG. 8.

Figure 12:
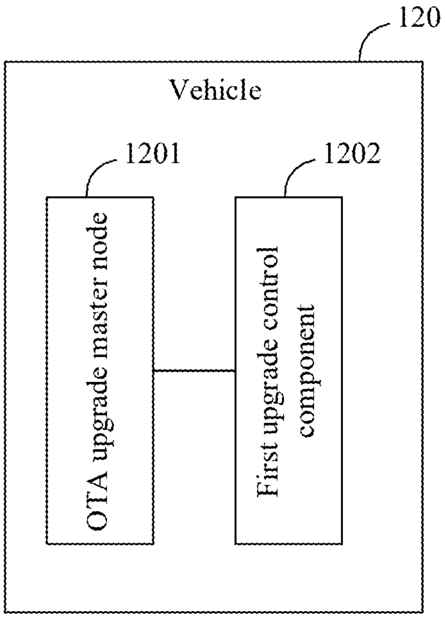
FIG. 12 is a schematic diagram of a structure of a vehicle according to an embodiment of this application.

FIG. 12 is a schematic diagram of a structure of a vehicle 120 according to an embodiment of this application. The vehicle 120 may be the vehicle in the embodiment shown in FIG. 9. The vehicle 120 includes an OTA upgrade master node 1201 and a first upgrade control component 1202.

An OTA upgrade master node 1201 in the vehicle is configured to send a first message to a server, where the first message is used to indicate version information of components in at least two component groups in the vehicle.

A first upgrade control component 1202 in the vehicle is configured to download a first upgrade package from the server, where the first upgrade package is used to upgrade a first component group in the at least two component groups, and the first upgrade control component is configured to control a component in the first component group to perform OTA upgrade.

In this embodiment of this application, the server generates an upgrade package of a component group for the component group in the vehicle, and then distributes the upgrade package to an upgrade control component in the component group, so that the upgrade control component upgrades a component in the component group. In this way, each upgrade control component may download an upgrade package for a component group to which the upgrade control component belongs, and upgrade packages for component groups may further be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment, the OTA upgrade master node 1201 in the vehicle is further configured to:

receive a first download address that is used to download the first upgrade package and that is sent by the server, where the first upgrade package is used to upgrade the first component group in the at least two component groups in the vehicle, and the first component group includes the first upgrade control component configured to control the component in the first component group to perform OTA upgrade; and send the first download address to the first upgrade control component in the vehicle.

In an embodiment, the first upgrade control component 1202 in the vehicle is further configured to:

receive the first download address that is sent by the OTA upgrade master node and that is used to download the first upgrade package;

establish a first secure channel with the server based on the first download address; and receive, through the first secure channel, the first upgrade package sent by the server.

The foregoing describes a manner of downloading an upgrade data package. The OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the server directly establishes a connection to a vehicle upgrade apparatus 110 in the group to send the download address, network resource overheads can be reduced, complexity can be reduced, and upgrade efficiency can be improved.

In another possible implementation, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another possible implementation, the first message is further used to indicate group information of the at least two component groups.

It can be learned that the OTA upgrade master node may send group information of a component in the vehicle to the server, so that the server determines the at least two component groups based on the group information. Further, the group information may be determined by the OTA upgrade master node based on at least one of a preconfigured policy, a node connection relationship in the vehicle, a configuration of each node, load, and the like.

In another possible implementation, the OTA upgrade master node 1201 in the vehicle is further configured to:

receive version information of the component in the first component group from the first upgrade control component.

It can be learned that the first upgrade control component may collect the version information of the component in the group and send the version information to the OTA upgrade master node. Subsequently, the OTA upgrade master node may send the version information to the server, to determine a component that needs to be updated.

In another possible implementation, the first upgrade package is signed by the server, and the first upgrade control component 1202 in the vehicle is further configured to:

verify a signature of the first upgrade package; and in response to that the verification on the signature succeeds, control, based on the first upgrade package, the component in the first component group to perform OTA upgrade.

It can be learned that before upgrade, the upgrade control component first verifies a source of the data package based on the signature, to avoid establishing a connection to an untrusted server, thereby improving security in a vehicle upgrade process.

It should be noted that, for implementation of each unit, refer to corresponding descriptions in the embodiment shown in FIG. 9.

As shown in FIG. 11, the vehicle upgrade apparatus 110 may be the server in the embodiment shown in FIG. 9, or a module in the server, for example, a chip or an integrated circuit. The apparatus 110 may include a processing unit 1101, a sending unit 1102, and a receiving unit 1103. The units are described as follows:

The receiving unit 1103 is configured to receive a first message from an OTA upgrade master node in a vehicle, where the first message is used to indicate version information of components in at least two component groups in the vehicle, and each of the at least two component groups includes one upgrade control component configured to control a component in the component group to perform OTA upgrade.

The processing unit 1101 is configured to generate a first upgrade package for a first component group in the at least two component groups based on the version information of the components in the at least two component groups.

The sending unit 1102 is configured to send the first upgrade package to a first upgrade control component in the vehicle, where the first upgrade package is used to perform OTA upgrade for a component in the first component group, and the first upgrade control component is configured to control the component in the first component group to perform OTA upgrade. Further, optionally, the vehicle upgrade apparatus 110 may be deployed in a server.

In this embodiment of this application, the vehicle upgrade apparatus 110 generates an upgrade package of a component group for the component group in the vehicle, and then distributes the upgrade package to an upgrade control component in the component group, so that the upgrade control component upgrades a component in the component group. Compared with that in a case in which one OTA upgrade master module performs upgrade control on all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment, the processing unit 1101 is further configured to allocate a first download address for downloading the first upgrade package;

the sending unit 1102 is further configured to send the first download address to the OTA upgrade master node in the vehicle;

the processing unit 1102 is further configured to establish, with the first upgrade control component in the vehicle, a first secure channel for downloading the first upgrade package; and the sending unit 1102 is further configured to send the first upgrade package to the first upgrade control component through the first secure channel.

The foregoing describes a manner of downloading an upgrade data package. The vehicle upgrade apparatus 110 may allocate a download address to the first upgrade package. The download address may be first sent to the OTA upgrade master node, and then the OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the vehicle upgrade apparatus 110 directly establishes a connection to the upgrade control component in the group to send the download address, network resource overheads can be reduced, complexity can be reduced, and upgrade efficiency can be improved.

In another possible implementation, the first secure channel includes at least a hypertext transfer protocol secure HTTPS secure channel, a transport layer security TLS secure channel, or a datagram transport layer security DTLS secure channel.

In another possible implementation, the receiving unit 1103 is further configured to receive, from the OTA upgrade master node by using the receiving unit, group information for indicating the at least two component groups.

The foregoing embodiment describes a manner of determining a plurality of component groups. The OTA upgrade master node may send group information of a component in the vehicle to the vehicle upgrade apparatus 110, so that the vehicle upgrade apparatus 110 determines the at least two component groups based on the group information. Further, the at least two component groups may be determined by the OTA upgrade master node based on at least one of a preconfigured policy, a node connection relationship in the vehicle, a configuration of each node, load, and the like.

In another possible implementation, the processing unit 1101 is further configured to: query, based on an identifier of the vehicle, component group information preconfigured in the vehicle upgrade apparatus 110, and determine the at least two component groups in the vehicle based on a query result.

The foregoing embodiment describes another manner of determining a plurality of component groups. The vehicle upgrade apparatus 110 may query the group information based on the identifier of the vehicle. Because component group information of a vehicle of a specific model may be preconfigured or predefined, the vehicle upgrade apparatus 110 may query the component group information based on the identifier of the vehicle (for example, a vehicle identification number of the vehicle or a model of the vehicle), to determine the component groups of the vehicle.

In another possible implementation, the receiving unit 1103 is further configured to receive a first message from the OTA upgrade master node, where the first message includes version information for indicating components in the at least two component groups; and the processing unit 1101 is further configured to generate the first upgrade package for the first component group in the at least two component groups based on the version information of the components in the at least two component groups.

It can be learned that the vehicle upgrade apparatus 110 determines the first upgrade package based on the version information of the component. Further, the vehicle upgrade apparatus 110 may determine, based on version information of the component in the first component group, that a component whose version needs to be upgraded exists in the first component group, to package upgrade data to obtain the first upgrade package.

It should be noted that, for implementation of each unit, refer to corresponding descriptions in the embodiment shown in FIG. 9.

As shown in FIG. 11, the vehicle upgrade apparatus 110 may be the OTA upgrade master node in the embodiment shown in FIG. 10, or a module in the OTA upgrade master node, for example, a chip or an integrated circuit. The apparatus 110 may include a processing unit 1101, a sending unit 1102, and a receiving unit 1103. The units are described as follows:

The receiving unit 1103 is configured to receive version information of a component in a first component group from a first upgrade control component, where the first component group is one of at least two component groups in a vehicle, and the first upgrade control component is configured to control the component in the first component group to perform OTA upgrade.

The processing unit 1101 is configured to generate a first upgrade package for the first component group in the at least two component groups based on version information of components in the at least two component groups, where an upgrade control component in the first component group is the first upgrade control component.

The sending unit 1102 is configured to send, to the first upgrade control component, a first download address for downloading the first upgrade package, where the first upgrade package is used to perform OTA upgrade for the component in the first component group. Further, the vehicle upgrade apparatus 110 is deployed in the vehicle.

In this embodiment of this application, the vehicle upgrade apparatus 110 collects version information of a plurality of components in the vehicle. The version information may be used to determine a component that needs to be upgraded, and generate an upgrade package. A download address is allocated to the upgrade package, and the vehicle upgrade apparatus 110 distributes the download address to an upgrade control component in a component group, so that the upgrade control component downloads the corresponding upgrade package to upgrade the component in the component group. In this way, upgrade packages for component groups may be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another possible implementation, the first upgrade control component is a domain controller DC or a vehicle integration unit VIU.

In another possible implementation, load of the first upgrade control component is less than or equal to a first threshold; and/or a security certificate is deployed in the first upgrade control component.

It should be noted that, for implementation of each unit, refer to corresponding descriptions in the embodiment shown in FIG. 10.

As shown in FIG. 11, the vehicle upgrade apparatus 110 may be the first upgrade control component in the embodiment shown in FIG. 10, or a module in the first upgrade control component, for example, a chip or an integrated circuit. The apparatus 110 may include a sending unit 1102 and a receiving unit 1103. The units are described as follows:

The sending unit 1102 is configured to send version information of a component in a first component group to an OTA upgrade master node in a vehicle.

The receiving unit 1103 is configured to receive a first download address that is sent by the OTA upgrade master node and that is used to download a first upgrade package, where the first upgrade package is used to perform OTA upgrade for the component in the first component group.

In this embodiment of this application, the vehicle upgrade apparatus 110 receives a download address from the OTA upgrade master node, and downloads, based on the download address, an upgrade package for a component group to which the vehicle upgrade apparatus belongs, and upgrade packages for component groups may further be downloaded at the same time, so that vehicle upgrade apparatuses 110 in all groups perform upgrade at the same time. Compared with that in a case in which one OTA upgrade master module upgrades all components in the vehicle, vehicle upgrade efficiency is improved. Further, each component may be upgraded by a close vehicle upgrade apparatus 110 in a group, so that vehicle upgrade complexity is reduced. In addition, the vehicle upgrade apparatus 110 in each component group controls the component in the group to perform upgrade, and can monitor, detect, and command upgrade in a timely manner. Therefore, upgrade of the component can be completed as soon as possible, and vehicle stability can be improved.

It should be noted that, for implementation of each unit, refer to corresponding descriptions in the embodiment shown in FIG. 10.

Figure 13:
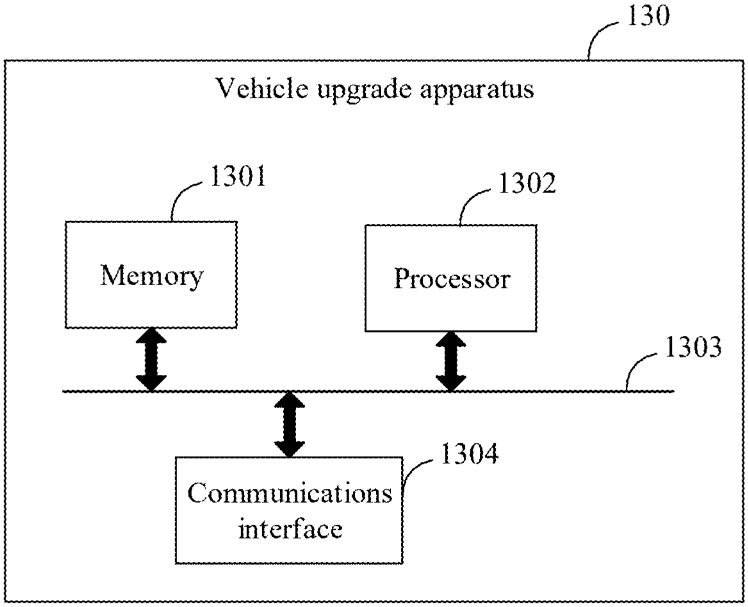
FIG. 13 is a schematic diagram of a structure of another vehicle upgrade apparatus according to an embodiment of this application.

FIG. 13 is a schematic diagram of a structure of a vehicle upgrade apparatus 130 according to an embodiment of this application. The apparatus 130 may include at least one memory 1301 and at least one processor 1302. In an embodiment, a bus 1303 may be further included. Further, optionally, a communications interface 1304 may be included. The memory 1301, the processor 1302, and the communications interface 1304 are connected by using the bus 1303.

The memory 1301 is configured to provide storage space, and the storage space may store data such as an operating system and a computer program. The memory 1301 may be one or a combination of a random access memory (RAM), a read-only memory (ROM), an erasable programmable read-only memory (EPROM), a compact disc read-only memory (CD-ROM), or the like.

The processor 1302 is a module that performs an arithmetic operation and/or a logic operation, and may be one or a combination of processing modules such as a central processing unit (CPU), a graphics processing unit (GPU), a microprocessor unit (MPU), an application-specific integrated circuit (ASIC), a field programmable gate array (FPGA), and a complex programmable logic device (CPLD).

The communications interface 1304 is configured to receive data sent from the outside and/or send data to the outside, and may be an interface of a wired link such as an Ethernet cable, or may be an interface of a wireless link (Wi-Fi, Bluetooth, general wireless transmission, or the like). In an embodiment, the communications interface 1304 may further include a transmitter (for example, a radio frequency transmitter or an antenna), a receiver, or the like coupled to the interface.

The processor 1302 in the apparatus 130 is configured to read the computer program stored in the memory 1301, to perform the foregoing vehicle upgrade method, for example, the vehicle upgrade method described in any embodiment shown in FIG. 2, FIG. 7, FIG. 8, FIG. 9, or FIG. 10.

In some possible implementations, the vehicle upgrade apparatus 130 may be the server in the embodiment shown in FIG. 4, FIG. 7, or FIG. 8, or a module in the server, for example, a chip or an integrated circuit. The processor 1302 in the apparatus 130 is configured to read the computer program stored in the memory 1301, to perform the following operations:

- determining at least two component groups in a vehicle, where each component group includes one upgrade control component configured to control a component in the component group to perform OTA upgrade;
- generating a first upgrade package for a first component group in the at least two component groups, where an upgrade control component in the first component group is a first upgrade control component; and
- sending the first upgrade package to the first upgrade control component through the communications interface 1304, where the first upgrade package is used to upgrade a component in the first component group. Further, optionally, the vehicle upgrade apparatus 130 may be deployed in a server.

In this embodiment of this application, the vehicle upgrade apparatus 130 generates an upgrade package of a component group for the component group in the vehicle, and then distributes the upgrade package to an upgrade control component in the component group, so that the upgrade control component upgrades a component in the component group. Compared with that in a case in which one OTA upgrade master module performs upgrade control on all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment, the processor 1302 is further configured to:

- allocate a first download address for downloading the first upgrade package;
- send the first download address to an OTA upgrade master node in the vehicle through the communications interface 1304;

establish, with the first upgrade control component through the communications interface 1304, a first secure channel for downloading the first upgrade package; and send the first upgrade package to the first upgrade control component through the first secure channel by using the communications interface 1304.

The foregoing describes a manner of downloading an upgrade data package. The vehicle upgrade apparatus 130 may allocate a download address to the first upgrade package. The download address may be first sent to the OTA upgrade master node, and then the OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the vehicle upgrade apparatus 130 directly establishes a connection to the upgrade control component in the group to send the download address, network resource overheads can be reduced, complexity can be reduced, and upgrade efficiency can be improved.

In another possible implementation, the first secure channel includes at least a hypertext transfer protocol secure HTTPS secure channel, a transport layer security TLS secure channel, or a datagram transport layer security DTLS secure channel.

In another possible implementation, the processor 1302 is further configured to receive, from the OTA upgrade master node through the communications interface 1304, group information for indicating the at least two component groups.

The foregoing embodiment describes a manner of determining a plurality of component groups. The OTA upgrade master node may send group information of a component in the vehicle to the vehicle upgrade apparatus 130, so that the vehicle upgrade apparatus 130 determines the at least two component groups based on the group information. Further, the at least two component groups may be determined by the OTA upgrade master node based on at least one of a preconfigured policy, a node connection relationship in the vehicle, a configuration of each node, load, and the like.

In another possible implementation, the processor 1302 is further configured to: query, based on an identifier of the vehicle, component group information preconfigured in the vehicle upgrade apparatus 130, and determine the at least two component groups in the vehicle based on a query result.

The foregoing embodiment describes another manner of determining a plurality of component groups. The vehicle upgrade apparatus 130 may query the group information based on the identifier of the vehicle. Because component group information of a vehicle of a specific model may be preconfigured or predefined, the vehicle upgrade apparatus 130 may query the component group information based on the identifier of the vehicle (for example, a vehicle identification number of the vehicle or a model of the vehicle), to determine the component groups of the vehicle.

In another possible implementation, the processor 1302 is further configured to receive a first message from the OTA upgrade master node through the communications interface 1304, where the first message includes version information for indicating components in the at least two component groups; and the processor 1302 is further configured to generate the first upgrade package for the first component group in the at least two component groups based on the version information of the components in the at least two component groups.

It can be learned that the vehicle upgrade apparatus 130 determines the first upgrade package based on the version information of the component. Further, the vehicle upgrade apparatus 130 may determine, based on version information of the component in the first component group, that a component whose version needs to be upgraded exists in the first component group, to package upgrade data to obtain the first upgrade package.

It should be noted that, for implementation of each unit, refer to corresponding descriptions in the embodiment shown in FIG. 4, FIG. 7, or FIG. 8.

In some possible implementations, the vehicle upgrade apparatus 130 may be the OTA upgrade master node in the embodiment shown in FIG. 4, FIG. 7, or FIG. 8, or a module in the upgrade node, for example, a chip or an integrated circuit. The processor 1302 in the apparatus 130 is configured to read the computer program stored in the memory 1301, to perform the following operations:

sending a first message to a server through the communications interface 1304, where the first message is used to indicate version information of components in at least two component groups in a vehicle;

receiving, through the communications interface 1304, a first download address that is used to download the first upgrade package and that is sent by the server, where the first upgrade package is used to upgrade a first component group in the at least two component groups in the vehicle, and the first component group includes a first upgrade control component configured to control a component in the first component group to perform OTA upgrade; and sending the first download address to the first upgrade control component through the communications interface 1304. Further, the vehicle upgrade apparatus 130 may be deployed in the vehicle.

In this embodiment of this application, the vehicle upgrade apparatus 130 reports the version information of the component in the vehicle to the server, and the server may determine, based on the version information, a component that needs to be upgraded, and generate an upgrade package. A download address is allocated to the upgrade package, and the vehicle upgrade apparatus 130 distributes the download address to an upgrade control component in a component group, so that the upgrade control component downloads the corresponding upgrade package to upgrade the component in the component group. In this way, upgrade packages for component groups may be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another possible implementation, the first message is further used to indicate group information of the at least two component groups.

It can be learned that the vehicle upgrade apparatus 130 may send group information of a component in the vehicle to the server, so that the server determines the at least two component groups based on the group information. Further, the group information may be determined by the vehicle upgrade apparatus 130 based on at least one of a preconfigured policy, a node connection relationship in the vehicle, a configuration of each node, load, and the like.

In another possible implementation, the processor 1302 is further configured to receive, through the communications interface 1304, version information that is of at least one component in the vehicle and that is sent by a report node.

The report node may be a domain controller, a gateway, a distributed gateway, a vehicle integration unit, or the like in the vehicle. The report node may report, to the vehicle upgrade apparatus 130, the version information of the component collected by the report node. For example, a cockpit domain controller (CDC) may collect version information of a plurality of components (for example, one or more of a microphone, a radar, a speaker, and a keyless start module) in a cockpit domain, and then may send the version information to the vehicle upgrade apparatus 130. Subsequently, the vehicle upgrade apparatus 130 may send the version information to the server, to determine a component that needs to be updated.

In another embodiment, the processor 1302 is further configured to determine the at least two component groups in the vehicle.

Further, the at least two component groups may be determined by the vehicle upgrade apparatus 130 based on at least one of a preconfigured policy, a node connection relationship in the vehicle, a configuration of each node, load, and the like. For example, the vehicle upgrade apparatus 130 may group a plurality of components with functions in one area into one component group, and then determine, based on a load status of a control component (for example, a domain controller DC and a vehicle integration unit VIU) with a centralized computing capability in the component group, whether to set a control component as an upgrade control component. For another example, an upgrade control component may be first determined based on a configuration of each component, and then components close to the upgrade control component are used as a component group. Specifically, for example, the upgrade control component needs to establish a secure channel with the server based on a security certificate. In this case, only a component in which the security certificate is deployed is qualified to be determined as the upgrade control component. For another example, an upgrade control component needs to establish a connection to the server. Therefore, if load of a current node is relatively high, the current node is not suitable to be determined as the upgrade control component.

In another embodiment, the processor 1302 is further configured to receive version information of the component in the first component group from the first upgrade control component through the communications interface 1304.

It can be learned that the first upgrade control component may collect the version information of the component in the group and send the version information to the vehicle upgrade apparatus 130. Subsequently, the vehicle upgrade apparatus 130 may send the version information to the server, to determine a component that needs to be updated.

In another embodiment, the first upgrade control component is a domain controller DC or a vehicle integration unit VIU.

In another embodiment, load of the first upgrade control component is less than or equal to a first threshold; and/or a security certificate is deployed in the first upgrade control component.

It should be noted that, for implementation of each unit, refer to corresponding descriptions in the embodiment shown in FIG. 4, FIG. 7, or FIG. 8.

In some embodiments, the vehicle upgrade apparatus 130 may be the first control component in the embodiment shown in FIG. 4, FIG. 7, or FIG. 8, or a module in the first control component, for example, a chip or an integrated circuit. The processor 1302 in the apparatus 130 is configured to read the computer program stored in the memory 1301, to perform the following operations:

- receiving, through the communications interface 1304, a first upgrade package sent by a server, where the first upgrade package is used to perform OTA upgrade for a component in a first component group; and
- controlling, based on the first upgrade package, the component in the first component group to perform OTA upgrade. Further, the vehicle upgrade apparatus 130 is used in a vehicle, the vehicle upgrade apparatus 130 is configured to control the component in the first component group to perform OTA upgrade, and the first component group is one of at least two component groups in the vehicle.

In this embodiment of this application, the server generates the first upgrade package of the first component group for the component group in the vehicle, and then sends the first upgrade package to the vehicle upgrade apparatus 130, so that the vehicle upgrade apparatus 130 upgrades the component in the component group. In this way, a vehicle upgrade apparatus 130 in each group may download an upgrade package for the component group to which the vehicle upgrade apparatus belongs, and upgrade packages for component groups may further be downloaded at the same time, so that vehicle upgrade apparatuses 130 in all groups perform upgrade at the same time. Compared with that in a case in which one OTA upgrade master module upgrades all components in the vehicle, vehicle upgrade efficiency is improved. Further, each component may be upgraded by a close vehicle upgrade apparatus 130 in a group, so that vehicle upgrade complexity is reduced. In addition, the vehicle upgrade apparatus 130 in each component group controls the component in the group to perform upgrade, and can monitor, detect, and command upgrade in a timely manner. Therefore, upgrade of the component can be completed as soon as possible, and vehicle stability can be improved.

In an embodiment, the processor 1302 is further configured to send version information of the component in the first component group to an OTA upgrade master node in the vehicle through the communications interface 1304.

It can be learned that the vehicle upgrade apparatus 130 may collect the version information of the component in the group and send the version information to the OTA upgrade master node. Subsequently, the OTA upgrade master node may send the version information to the server, to determine a component that needs to be updated.

In another embodiment, the processor 1302 is further configured to:

receive, through the communications interface 1304, a first download address that is sent by the OTA upgrade master node and that is used to download the first upgrade package;

establish a first secure channel with the server through the communications interface 1304 based on the first download address, where the first secure channel is used to download the first upgrade package; and receive, through the first secure channel by using the communications interface 1304, the first upgrade package sent by the server.

The foregoing describes a manner of downloading an upgrade data package. The OTA upgrade master node distributes the download address to the vehicle upgrade apparatus 130 that needs the first upgrade package to complete upgrade. Because a data size of the download address is usually small, the download address is first sent to the upgrade master node and then distributed to a corresponding vehicle upgrade apparatus 130 in each group. Compared with that in a case in which the server directly establishes a connection to a vehicle upgrade apparatus 130 in the group to send the download address, network resource overheads can be reduced, complexity can be reduced, and upgrade efficiency can be improved.

In another embodiment, the first upgrade package is signed by the server, and the processor 1302 is further configured to:

verify a signature of the first upgrade package; and in response to that the verification on the signature succeeds, control, based on the first upgrade package, the component in the first component group to perform OTA upgrade.

It can be learned that before upgrade, the upgrade control apparatus first verifies a source of the data package based on the signature, to avoid establishing a connection to an untrusted server, thereby improving security in a vehicle upgrade process.

It should be noted that, for implementation of each unit, refer to corresponding descriptions in the embodiment shown in FIG. 4, FIG. 7, or FIG. 8.

In some embodiments, the vehicle upgrade apparatus 130 may be the server in the embodiment shown in FIG. 4, FIG. 7, or FIG. 8, or a module in the server, for example, a chip or an integrated circuit. The processor 1302 in the apparatus 130 is configured to read the computer program stored in the memory 1301, to perform the following operations:

receiving a first message from an OTA upgrade master node in a vehicle through the communications interface 1304, where the first message is used to indicate version information of components in at least two component groups in the vehicle, and each of the at least two component groups includes one upgrade control component configured to control a component in the component group to perform OTA upgrade;

generating a first upgrade package for a first component group in the at least two component groups based on the version information of the components in the at least two component groups; and sending the first upgrade package to a first upgrade control component in the vehicle through the communications interface 1304, where the first upgrade package is used to perform OTA upgrade for a component in the first component group, and the first upgrade control component is configured to control the component in the first component group to perform OTA upgrade. Further, optionally, the vehicle upgrade apparatus 130 may be deployed in a server.

In this embodiment of this application, the vehicle upgrade apparatus 130 generates an upgrade package of a component group for the component group in the vehicle, and then distributes the upgrade package to an upgrade control component in the component group, so that the upgrade control component upgrades a component in the component group. Compared with that in a case in which one OTA upgrade master module performs upgrade control on all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment, the processor 1302 is further configured to:

allocate a first download address for downloading the first upgrade package;

send the first download address to the OTA upgrade master node in the vehicle through the communications interface 1304;

establish, with the first upgrade control component in the vehicle, a first secure channel for downloading the first upgrade package; and send the first upgrade package to the first upgrade control component through the first secure channel by using the communications interface 1304.

The foregoing describes a manner of downloading an upgrade data package. The vehicle upgrade apparatus 130 may allocate a download address to the first upgrade package. The download address may be first sent to the OTA upgrade master node, and then the OTA upgrade master node distributes the download address to the first upgrade control component that needs the first upgrade package to complete upgrade. Because a data size of the download address is usually small, the download address is first sent to the upgrade master node and then distributed to a corresponding upgrade control component in each group. Compared with that in a case in which the vehicle upgrade apparatus 130 directly establishes a connection to the upgrade control component in the group to send the download address, network resource overheads can be reduced, complexity can be reduced, and upgrade efficiency can be improved.

In another embodiment, the first secure channel includes at least a hypertext transfer protocol secure HTTPS secure channel, a transport layer security TLS secure channel, or a datagram transport layer security DTLS secure channel.

In another embodiment, the processor 1302 is further configured to receive, from the OTA upgrade master node through the communications interface 1304, group information for indicating the at least two component groups.

The foregoing embodiment describes a manner of determining a plurality of component groups. The OTA upgrade master node may send group information of a component in the vehicle to the vehicle upgrade apparatus 130, so that the vehicle upgrade apparatus 130 determines the at least two component groups based on the group information. Further, the at least two component groups may be determined by the OTA upgrade master node based on at least one of a preconfigured policy, a node connection relationship in the vehicle, a configuration of each node, load, and the like.

In another embodiment, the processor 1302 is further configured to: query, based on an identifier of the vehicle, component group information preconfigured in the vehicle upgrade apparatus 130, and determine the at least two component groups in the vehicle based on a query result.

The foregoing embodiment describes another manner of determining a plurality of component groups. The vehicle upgrade apparatus 130 may query the group information based on the identifier of the vehicle. Because component group information of a vehicle of a specific model may be preconfigured or predefined, the vehicle upgrade apparatus 130 may query the component group information based on the identifier of the vehicle (for example, a vehicle identification number of the vehicle or a model of the vehicle), to determine the component groups of the vehicle.

In another embodiment, the processor 1302 is further configured to:

receive a first message from the OTA upgrade master node through the communications interface 1304, where the first message includes version information for indicating components in the at least two component groups; and generate the first upgrade package for the first component group in the at least two component groups based on the version information of the components in the at least two component groups.

It can be learned that the vehicle upgrade apparatus 130 determines the first upgrade package based on the version information of the component. Further, the vehicle upgrade apparatus 130 may determine, based on version information of the component in the first component group, that a component whose version needs to be upgraded exists in the first component group, to package upgrade data to obtain the first upgrade package.

It should be noted that, for implementation of each unit, refer to corresponding descriptions in the embodiment shown in FIG. 9.

In some embodiments, the vehicle upgrade apparatus 130 may be the OTA upgrade master node in the embodiment shown in FIG. 10, or a module in the OTA master node, for example, a chip or an integrated circuit. The processor 1302 in the apparatus 130 is configured to read the computer program stored in the memory 1301, to perform the following operations:

receiving version information of a component in a first component group from a first upgrade control component through the communications interface 1304, where the first component group is one of at least two component groups in a vehicle, and the first upgrade control component is configured to control the component in the first component group to perform OTA upgrade;

generating a first upgrade package for the first component group in the at least two component groups based on version information of components in the at least two component groups, where an upgrade control component in the first component group is the first upgrade control component; and sending, to the first upgrade control component through the communications interface 1304, a first download address for downloading the first upgrade package, where the first upgrade package is used to perform OTA upgrade for the component in the first component group. Further, the vehicle upgrade apparatus 130 is deployed in the vehicle.

In this embodiment of this application, the vehicle upgrade apparatus 130 collects version information of a plurality of components in the vehicle. The version information may be used to determine a component that needs to be upgraded, and generate an upgrade package. A download address is allocated to the upgrade package, and the vehicle upgrade apparatus 130 distributes the download address to an upgrade control component in a component group, so that the upgrade control component downloads the corresponding upgrade package to upgrade the component in the component group. In this way, upgrade packages for component groups may be downloaded at the same time, so that upgrade control components perform upgrade at the same time. Compared with that in a case in which one OTA upgrade master module upgrades all components in the vehicle, vehicle upgrade efficiency is improved. Further, each component may be upgraded by a close upgrade control component, so that vehicle upgrade complexity is reduced. In addition, the upgrade control component in each component group controls the component in the group, and can monitor, detect, and command upgrade in a timely manner. Therefore, upgrade of the component can be completed as soon as possible, and vehicle stability can be improved.

In an embodiment, the first download address is included in a download policy package, and the download policy package further includes one or more of a download policy, an upgrade condition, an upgrade policy, or a valid time of the first download address. The download policy defines a rule for downloading the first upgrade package, the upgrade condition indicates a condition for performing upgrade by using the first upgrade package, and the upgrade policy defines a rule for performing upgrade based on the first upgrade package.

In another embodiment, the first upgrade control component is a domain controller DC or a vehicle integration unit VIU.

In another embodiment, load of the first upgrade control component is less than or equal to a first threshold; and/or a security certificate is deployed in the first upgrade control component.

It should be noted that, for implementation of each unit, refer to corresponding descriptions in the embodiment shown in FIG. 10.

In some embodiments, the vehicle upgrade apparatus 130 may be the first control component in the embodiment shown in FIG. 10, or a module in the first control component, for example, a chip or an integrated circuit. The processor 1302 in the apparatus 130 is configured to read the computer program stored in the memory 1301, to perform the following operations:

sending version information of a component in a first component group to an OTA upgrade master node in a vehicle through the communications interface 1304; and receiving, through the communications interface 1304, a first download address that is sent by the OTA upgrade master node and that is used to download a first upgrade package, where the first upgrade package is used to perform OTA upgrade for the component in the first component group.

In this embodiment of this application, the vehicle upgrade apparatus 130 receives a download address from the OTA upgrade master node, and downloads, based on the download address, an upgrade package for a component group to which the vehicle upgrade apparatus belongs, and upgrade packages for component groups may further be downloaded at the same time, so that vehicle upgrade apparatuses 130 in all groups perform upgrade at the same time. Compared with that in a case in which one OTA upgrade master module upgrades nodes in the vehicle, vehicle upgrade efficiency is improved. Further, each component may be upgraded by a close vehicle upgrade apparatus 130 in a group, so that vehicle upgrade complexity is reduced. In addition, the vehicle upgrade apparatus 130 in each component group controls the component in the group to perform upgrade, and can monitor, detect, and command upgrade in a timely manner. Therefore, upgrade of the component can be completed as soon as possible, and vehicle stability can be improved.

It should be noted that, for implementation of each unit, refer to corresponding descriptions in the embodiment shown in FIG. 10.

An embodiment of this application further provides a vehicle upgrade system. The vehicle upgrade system includes a server, an OTA upgrade master node, and a first upgrade control component. The server is the server described in FIG. 4, FIG. 7, or FIG. 8. The OTA upgrade master node is the OTA upgrade master node described in FIG. 4, FIG. 7, or FIG. 8. The first upgrade control component is the first upgrade control component described in FIG. 4, FIG. 7, or FIG. 8.

An embodiment of this application further provides a vehicle upgrade system. The vehicle upgrade system includes a server and a vehicle. Further, the vehicle includes an OTA upgrade master node and a first upgrade control component. The server is the server described in FIG. 9, and the vehicle is the vehicle described in FIG. 9.

An embodiment of this application further provides a vehicle upgrade system. The vehicle upgrade system includes an OTA upgrade master node and a first upgrade control component. The OTA upgrade master node is the OTA upgrade master node described in FIG. 10, and the first upgrade control component is the first upgrade control component described in FIG. 10.

An embodiment of this application further provides a computer-readable storage medium. The computer-readable storage medium stores a computer program. When the computer program runs on one or more processors, the method in any embodiment shown in FIG. 4, FIG. 7, FIG. 8, FIG. 9, or FIG. 10 is implemented.

An embodiment of this application further provides a chip system. The chip system includes at least one processor, a memory, and an interface circuit. The interface circuit is configured to provide information input/output for the at least one processor, and the memory stores a computer program. When the computer program is run on one or more processors, the method in any embodiment shown in FIG. 4, FIG. 7, FIG. 8, FIG. 9, or FIG. 10 is implemented.

An embodiment of this application further provides a chip system. The chip system includes at least one processor, a memory, and a communications interface. The communications interface is configured to receive and/or send data. The memory stores a computer program. When the computer program is run on one or more processors, the method in any embodiment shown in FIG. 4, FIG. 7, FIG. 8, FIG. 9, or FIG. 10 is implemented.

An embodiment of this application discloses a vehicle. The vehicle includes an OTA upgrade master node and a first upgrade control component. The OTA upgrade master node is the OTA upgrade master node described in FIG. 4, FIG. 7, FIG. 8, FIG. 9, or FIG. 10. The first upgrade control component is the first upgrade control component described in FIG. 4, FIG. 7, FIG. 8, FIG. 9, or FIG. 10. Alternatively, the vehicle may be replaced with an intelligent terminal or a transportation vehicle such as a drone or a robot.

An embodiment of this application further provides a computer program product. When the computer program product runs on one or more processors, the vehicle upgrade method described in any embodiment shown in FIG. 4, FIG. 7, FIG. 8, FIG. 9, or FIG. 10 may be implemented.

All or some of the foregoing embodiments may be implemented by using software, hardware, firmware, or any combination thereof. When software is used to implement the embodiments, all or some of the embodiments may be implemented in a form of a computer instruction product. When the computer instructions are loaded and executed on a computer, the procedures or functions according to embodiments of this application are all or partially implemented. The computer may be a general-purpose computer, a special-purpose computer, a computer network, or another programmable apparatus. The computer instructions may be stored in a computer-readable storage medium, or may be transmitted by using a computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

Sequence adjustment, combination, or deletion may be performed on the operations in the method embodiments of this application based on an actual requirement.

Modules in the apparatus embodiments of this application may be combined, divided, or deleted based on an actual requirement.

What is claimed is:

1. A vehicle, comprising:

at least two component groups;

at least one processor; and at least one memory;

wherein each of the at least two component groups comprises one upgrade control component to control a component in the component group to perform an over the air (OTA) upgrade, the at least one memory stores program instructions, and the at least one processor is coupled to the at least one memory to execute the instructions to:

send a first message to a server from an OTA upgrade master node, wherein the first message indicates version information of components in the at least two component groups in the vehicle and comprises an identifier of the vehicle; and download a first upgrade package and a second upgrade package from the server to a first upgrade control component and a second upgrade control component, respectfully, while bypassing the OTA upgrade master node, wherein the server queries, based on an identifier of a vehicle, component group information preconfigured in the server, wherein the component group information comprises, for each component group of the at least two component groups, an upgrade control component field that identifies an upgrade control component configured to control a component in the component group to perform an OTA upgrade;

the first upgrade package is used to upgrade a first component group corresponding to the first upgrade control component in the at least two component groups; and the second upgrade package is used to upgrade a second component group corresponding to the second upgrade control component in the at least two component groups.

2. The vehicle according to claim 1, wherein the first message further indicates group information of the at least two component groups.

3. The vehicle according to claim 1, wherein the at least one processor is coupled to the at least one memory to execute the instructions to:

receive version information of the component in the first component group from the first upgrade control component.

4. The vehicle according to claim 1, wherein the at least one processor is coupled to the at least one memory to execute the instructions to:

establish, with the server, a first secure channel for downloading the first upgrade package to a first upgrade control component, wherein the first secure channel comprises at least one of a hypertext transfer protocol secure (HTTPS) secure channel, a transport layer security (TLS) secure channel, or a datagram transport layer security (DTLS) secure channel; and receive the first upgrade package from the server through the first secure channel.

5. The vehicle according to claim 1, wherein the at least one processor is coupled to the at least one memory to execute the instructions to:

receive, from the server via the OTA upgrade master node, a download policy package comprising a first download address for downloading the first upgrade package, the download policy package further including one or more of a download policy, an upgrade condition, an upgrade policy, or a valid time of the first download address, wherein the download policy defines a rule for downloading the first upgrade package, the upgrade condition indicates a condition for performing upgrade using the first upgrade package, and the upgrade policy defines a rule for performing upgrade based on the first upgrade package.

6. The vehicle according to claim 1, wherein the first upgrade package is signed by the server, and the at least one processor is coupled to the at least one memory to execute the instructions to:

verify, at a first upgrade control component, a signature of the first upgrade package; and in response to that the verification on the signature succeeds, control, based on the first upgrade package, a component in a first component group to perform OTA upgrade.

7. A server, comprising:

at least one processor; and at least one memory;

wherein the at least one memory stores program instructions, and the at least one processor is coupled to the at least one memory to execute the instructions to:

receive a first message, from an over the air (OTA) upgrade master node, comprising version information corresponding to at least two component groups;

query, based on an identifier of a vehicle, component group information preconfigured in the server, wherein the component group information comprises, for each component group of the at least two component groups, an upgrade control component field that identifies an upgrade control component configured to control a component in the component group to perform an OTA upgrade;

determine the at least two component groups in the vehicle based on a query result of the query;

generate a first upgrade package for a first component group in the at least two component groups, wherein the first component group includes a first upgrade control component;

generate a second upgrade package for a second component group in the at least two component groups, wherein the second component group includes a second upgrade control component; and send the first upgrade package and the second upgrade package to the first upgrade control component and the second upgrade control component, respectively, as identified by the upgrade control component field in the component group information, while bypassing the OTA upgrade master node, wherein the first upgrade package is used to upgrade a component in the first component group;

the second upgrade package is used to upgrade a component in the second component group; and the first upgrade package and the second upgrade package are sent to the first upgrade control component and the second upgrade control component, respectively, based on the first message received from the OTA upgrade master node.

8. The server according to claim 7, wherein the at least one processor is coupled to the at least one memory to execute the instructions to:

allocate a first download address for downloading the first upgrade package; and send the first download address to the OTA upgrade master node in the vehicle; and establish, with the first upgrade control component, a first secure channel for downloading the first upgrade package; and send the first upgrade package to the first upgrade control component through the first secure channel.

9. The server according to claim 7, wherein the at least one processor is coupled to the at least one memory to execute the instructions to:

receive, from the OTA upgrade master node, group information for indicating the at least two component groups.

10. The server according to claim 7, wherein the at least one processor is coupled to the at least one memory to execute the instructions to:

receive, the first message from the OTA upgrade master node, wherein the first message comprises version information for indicating components in the at least two component groups; and generate the first upgrade package for the first component group in the at least two component groups based on the version information of the components in the at least two component groups.

11. The server according to claim 7, wherein the at least one processor is coupled to the at least one memory to execute the instructions to:

establish, with the first upgrade control component, a first secure channel for downloading the first upgrade package, wherein the first secure channel comprises at least one of a hypertext transfer protocol secure (HTTPS)

secure channel, a transport layer security (TLS) secure channel, or a datagram transport layer security (DTLS) secure channel; and send the first upgrade package to the first upgrade control component through the first secure channel.

12. The server according to claim 7, wherein the at least one processor is coupled to the at least one memory to execute the instructions to:

allocate a first download address for downloading the first upgrade package, wherein the first download address is included in a download policy package, and the download policy package further includes one or more of a download policy, an upgrade condition, an upgrade policy, or a valid time of the first download address, wherein the download policy defines a rule for downloading the first upgrade package, the upgrade condition indicates a condition for performing upgrade by using the first upgrade package, and the upgrade policy defines a rule for performing upgrade based on the first upgrade package; and send the download policy package to the OTA upgrade master node in the vehicle.

13. The server according to claim 7, wherein in response to verifying a signature of the first upgrade package, the first upgrade control component controls, based on the first upgrade package, the component in the first component group to perform OTA upgrade.

14. A system, comprising:

at least one processor; and at least one memory;

wherein the at least one memory stores program instructions, and the at least one processor is coupled to the at least one memory to execute the instructions to:

send a first message to a server from an over the air (OTA) upgrade master node in a vehicle, wherein the first message indicates version information of components in at least two component groups in the vehicle and comprises an identifier of the vehicle;

receive, from the server, a first download address for downloading a first upgrade package and a second download address for downloading a second upgrade package, wherein the server queries, based on an identifier of a vehicle, component group information preconfigured in the server, wherein the component group information comprises, for each component group of the at least two component groups, an upgrade control component field that identifies an upgrade control component configured to control a component in the component group to perform an OTA upgrade;

the first upgrade package is used to upgrade a first component group in the at least two component groups in the vehicle, and the first component group comprises a first upgrade control component to control a component in the first component group to perform OTA upgrade; and the second upgrade package is used to upgrade a second component group in the at least two component groups in the vehicle, and the second component group comprises a second upgrade control component to control a component in the second component group to perform OTA upgrade;

send, the first download address and the second download address to the first upgrade control component and the second upgrade control component, respectively, as identified by the upgrade control component field in the component group information;

establish a first channel between the server and the first upgrade control component that bypasses the OTA upgrade master node, wherein the server provides the first upgrade package to the first upgrade control component through the first channel; and establish a second channel between the server and the second upgrade control component that bypasses the OTA upgrade master node, wherein the server provides the second upgrade package to the second upgrade control component through the second channel concurrently with when the server provides the first upgrade package to the first upgrade control component through the first channel.

15. The system according to claim 14, wherein the first message further indicates group information of the at least two component groups.

16. The system according to claim 14, wherein the at least one processor is coupled to the at least one memory to execute the instructions to:

receive version information of the component in the first component group from the first upgrade control component.

17. The system according to claim 14, wherein the first channel comprises at least one of a hypertext transfer protocol secure (HTTPS) secure channel, a transport layer security (TLS) secure channel, or a datagram transport layer security (DTLS) secure channel established between the server and the first upgrade control component for downloading the first upgrade package.

18. The system according to claim 14, wherein the first download address is included in a download policy package, and the download policy package further includes one or more of a download policy, an upgrade condition, an upgrade policy, or a valid time of the first download address, the download policy defines a rule for downloading the first upgrade package, the upgrade condition indicates a condition for performing upgrade by using the first upgrade package, and the upgrade policy defines a rule for performing upgrade based on the first upgrade package.

19. The system according to claim 14, wherein in response to verifying a signature of the first upgrade package the first upgrade control component controls, based on the first upgrade package, the component in the first component group to perform OTA upgrade.

* * * * *